US011809797B1

(12) United States Patent
Rittman et al.

(10) Patent No.: US 11,809,797 B1
(45) Date of Patent: Nov. 7, 2023

(54) SYSTEMS AND METHODS OF PREDICTIVE MANUFACTURING OF THREE-DIMENSIONAL, MULTI-PLANAR SEMICONDUCTORS

(71) Applicant: GBT Technologies Inc., Santa Monica, CA (US)

(72) Inventors: Danny Rittman, Oceanside, CA (US); Mo Jacob, Beverly Hills, CA (US)

(73) Assignee: GBT Technologies Inc., Santa Monica, CA (US)

( * ) Notice: Subject to any disclaimer, the term of this patent is extended or adjusted under 35 U.S.C. 154(b) by 0 days.

(21) Appl. No.: 18/098,140

(22) Filed: Jan. 18, 2023

Related U.S. Application Data

(60) Provisional application No. 63/393,959, filed on Jul. 31, 2022.

(51) Int. Cl.
| | |
|---|---|
| *G06F 30/27* | (2020.01) |
| *G06F 30/3308* | (2020.01) |
| *G06F 30/337* | (2020.01) |
| *G06F 111/16* | (2020.01) |

(52) U.S. Cl.
CPC .......... *G06F 30/337* (2020.01); *G06F 30/27* (2020.01); *G06F 30/3308* (2020.01); *G06F 2111/16* (2020.01)

(58) Field of Classification Search
USPC ...................................................... 716/106
See application file for complete search history.

(56) References Cited

U.S. PATENT DOCUMENTS

| | | | |
|---|---|---|---|
| 4,603,374 | A | 7/1986 | Wasielewski |
| 5,817,543 | A | 10/1998 | McAllister et al. |
| 6,033,931 | A | 3/2000 | Hoffman et al. |
| 6,054,757 | A | 4/2000 | Kobayashi et al. |
| 7,537,966 | B2 | 5/2009 | Connell et al. |
| 8,299,592 | B2 | 10/2012 | Suh et al. |

(Continued)

OTHER PUBLICATIONS

International Search Report and Written Opinion dated Jan. 9, 2020 in related International Application No. PCT/US2019/050266.

(Continued)

*Primary Examiner* — Bryce M Aisaka
(74) *Attorney, Agent, or Firm* — Eric L. Lane; Green Patent Law

(57) ABSTRACT

Predictive multi-planar semiconductor manufacturing systems and methods are provided including a processor, an artificial intelligence unit in communication with the processor, and a computer readable memory with processing instructions in communication with the processor. The manufacturing system receives and analyzes semiconductor design and manufacturing process rules and data and dimensions for a user's desired semiconductor. The artificial intelligence unit is configured to run simulations trying multiple three-dimensional, multi-planar shapes and analyzing for highest surface area yield based on the design and manufacturing process rules and data and the dimensions. The artificial intelligence unit is further configured to determine a three-dimensional, multi-planar shape for the desired semiconductor to optimize surface area based on the simulations and to construct the three-dimensional, multi-planar shape that optimizes surface area.

20 Claims, 22 Drawing Sheets

(56) References Cited

U.S. PATENT DOCUMENTS

| | | |
|---|---|---|
| 8,673,686 B2 | 3/2014 | Lee |
| 9,379,091 B2 | 6/2016 | England |
| 10,854,763 B2 | 12/2020 | Rittman et al. |
| 2004/0058255 A1* | 3/2004 | Jessen .................. G03F 1/36 430/311 |
| 2004/0104469 A1 | 6/2004 | Yagi |
| 2004/0108590 A1 | 6/2004 | Kledzik et al. |
| 2004/0178514 A1 | 9/2004 | Lee et al. |
| 2007/0023887 A1 | 2/2007 | Matsui |
| 2012/0248595 A1 | 10/2012 | Or-Bach |
| 2014/0111269 A1 | 4/2014 | Huang |
| 2015/0123284 A1 | 5/2015 | Jo |
| 2015/0282294 A1 | 10/2015 | Wakuda et al. |
| 2018/0053544 A1 | 2/2018 | Ware et al. |
| 2018/0096872 A1 | 4/2018 | Cheng et al. |
| 2019/0122960 A1 | 4/2019 | Lin |

OTHER PUBLICATIONS

Partial Supplementary European Search Report dated Sep. 2, 2022 in related European Patent Application No. 19862631.9.

* cited by examiner

Icosahedron - 20 Planes
Best for 3nm Process

Dodecahedron - 12 Planes
Best for 5nm Process

Octahedron - 8 Planes
Best for 10nm Process

Compare 3 Shapes - Octahedron, Dodecahedron, Icosahedron

Analyze Which is Better to Design and Manufacture the Process

SYSTEMS AND METHODS OF PREDICTIVE MANUFACTURING OF THREE-DIMENSIONAL, MULTI-PLANAR SEMICONDUCTORS

CROSS-REFERENCE TO RELATED APPLICATION

This application is a non-provisional of and claims priority to U.S. patent application Ser. No. 63/393,959, filed Jul. 31, 2022, which is hereby incorporated by reference herein in its entirety.

FIELD

The present disclosure relates to the field of semiconductor, integrated circuit, and microchip manufacturing. More particularly, the present disclosure relates to predictive systems and methods of manufacturing multi-dimensional, multi-planar semiconductors.

BACKGROUND

A notable recent development in the field of chip design is three-dimensional integrated circuits, the 3D IC. In microelectronics, a "three-dimensional integrated circuit" is an integrated circuit manufactured by stacking silicon wafers and/or dies and interconnecting them vertically using through-silicon VIAs so that they behave as a single device to achieve performance improvements at reduced power and a smaller footprint than conventional two-dimensional processes.

3D IC is just one of a host of 3D integration schemes that exploit the z-direction to achieve electrical performance benefits. They can be classified by their level of interconnect hierarchy at the global (package), intermediate (bond pad) and local (transistor) level. In general, 3D integration is a broad term that includes such technologies as 3D wafer-level packaging (3DWLP), 2.5D and 3D interposer-based integration, 3D stacked ICs (3D-SICs), monolithic 3D ICs, 3D heterogeneous integration, and 3D systems integration. International organizations such as the Jisso Technology Roadmap Committee (JIC) and the International Technology Roadmap for Semiconductors (ITRS) have worked to classify the various 3D integration technologies to further the establishment of standards and roadmaps of 3D integration.

Three-dimensional integrated circuits offer many benefits for future microprocessor designs. Among these is the potential for overcoming the barriers in interconnect scaling, thereby offering an opportunity to continue performance improvements using CMOS and other technologies. As the fabrication of 3D integrated circuits has become viable, new, challenging architectural, design and manufacturing techniques need to be developed, leveraging the benefits of fast latency, higher bandwidth, and heterogeneous integration capability that are offered by 3D technology. The cost of 3D integration is also a factor that improves as technologies become more advanced.

However, manufacturing 3D integrated circuits can be complicated because many shapes and variations are possible. Currently, fabrication of 3D, multi-planar chips is inefficient. Furthermore, current manufacturing methods cannot effectively provide specs for 3D chips to meet a user's specific needs. For example, if a chip design firm wants to design and manufacture a microchip in 3 nm node, existing manufacturing systems are not efficient at predicting what would be the best multi-planar shape to design and manufacture in this process, with the optimal area utilization.

In view of the issues discussed above, there is a need for further development of 3D or multi-dimensional IC manufacturing techniques. There is a need for a predictive manufacturing system and method that can design and produce optimized multi-plane surfaces and shape, according to the design and manufacturing process. There also is a need for a manufacturing system and method that can analyze, calculate, and determine what would be the best 3D, multi-planar shape to manufacture a chip according to the desired process dimensions.

SUMMARY

The present disclosure, in its many embodiments, alleviates to a great extent the disadvantages and problems associated with known semiconductor and IC fabrication systems and methods by providing predictive manufacturing systems and methods to determine the best 3D, multi-planar shape for a semiconductor, integrated circuit, or other microchip according to desired process dimensions. Disclosed systems and methods run simulations that try multiple shapes and, through artificial intelligence, analyze and determine the optimal shape.

Disclosed systems include a Machine Learning for IC manufacturing node, shape analysis and processing. An exemplary system includes Geometric deep learning of an IC manufacturing node geometrical and electrical characteristics complex data, creating graphs and multi-dimensional points. Then it applies a set of Convolutional Neural Networks to 3D objects, graphs and manifolds to process the data and reach a conclusion about the best 3D, MP shape. The system generates manufacturing process datasets, performing object classification, generates a family of possible shapes representations, simulates all of them, and matches the optimal 3D, multi-planar shape according to best ranking.

An exemplary method of predictive semiconductor manufacturing comprises receiving and analyzing semiconductor design and manufacturing process rules and data and receiving and analyzing dimensions for a user's desired semiconductor. Methods then run simulations trying multiple three-dimensional, multi-planar shapes and analyzing for the highest surface area yield based on the design and manufacturing process rules and data and the dimensions. A three-dimensional, multi-planar shape is determined for the desired semiconductor to optimize surface area based on the simulations, and the three-dimensional, multi-planar shape that optimizes surface area is constructed.

The semiconductor design and manufacturing process rules may comprise process geometrical design rules, connectivity design rules, Design for Manufacturing (DFM) rules, electrical rules, and/or reliability rules. In exemplary embodiments, the analyzing for highest surface area yield step comprises placing dummy circuits or test chips on the surfaces of the multiple three-dimensional, multi-planar shapes. The step of trying multiple three-dimensional, multi-planar shapes may comprise starting with a simple shape and increasing a number of surface planes to more complex three-dimensional, multi-planar shapes.

Exemplary methods further comprise studying each shape and its optimization capabilities and simulating packaging to fit the constructed three-dimensional, multi-planar shape. Methods may include running a simulated optimal thermal dissipation test on each shape. Exemplary methods also include testing the three-dimensional, multi-planar shapes for electrical connectivity and reliability.

An exemplary embodiment of a predictive multi-planar semiconductor manufacturing system comprises a processor, an artificial intelligence unit, and a computer readable memory. The artificial intelligence unit and the computer readable memory are in communication with the processor, and the computer readable memory contains processing instructions. The manufacturing system receives and analyzes semiconductor design and manufacturing process rules and data and dimensions for a user's desired semiconductor.

The artificial intelligence unit is configured to run simulations trying multiple three-dimensional, multi-planar shapes and analyzing for the highest surface area yield based on the design and manufacturing process rules and data and the dimensions. The artificial intelligence unit also is configured to determine a three-dimensional, multi-planar shape for the desired semiconductor to optimize surface area based on the simulations and to construct the three-dimensional, multi-planar shape that optimizes surface area. The system also may be configured to receive fabrication apparatus data.

In exemplary embodiments, the manufacturing system further comprises a graphical user interface. The graphical user interface may display the constructed three-dimensional, multi-planar shape. In exemplary embodiments, the graphical user interface displays analytics for one or more of the three-dimensional, multi-planar shapes such as simulation results, surface thermal maps, connectivity maps, and/or estimated yield area. The graphical user interface may also display statistics including silicon area utilization percentages for one or more of the three-dimensional, multi-planar shapes.

In exemplary embodiments, the artificial intelligence unit further comprises a neural network, and the neural network tries multiple three-dimensional, multi-planar shapes starting with a simple shape and increasing the number of surface planes to more complex three-dimensional, multi-planar shapes. An exemplary neural network has cognitive capabilities, learning from its operations to improve the three-dimensional, multi-planar shapes of the semiconductors.

In exemplary embodiments, the artificial intelligence unit places dummy circuits or test chips on surfaces of multiple three-dimensional, multi-planar shapes. The desired semiconductor may be an existing semiconductor, and in such cases the artificial intelligence unit determines a three-dimensional, multi-planar shape for the existing semiconductor. The artificial intelligence unit may simulate packaging to fit the constructed three-dimensional, multi-planar shape and can perform an electrothermal flow analysis on the multiple three-dimensional, multi-planar shapes.

Accordingly, it is seen that systems and methods of predictive semiconductor manufacturing are provided. These and other features of the disclosed embodiments will be appreciated from review of the following detailed description, along with the accompanying figures in which like reference numbers refer to like parts throughout.

BRIEF DESCRIPTION OF THE DRAWINGS

The foregoing and other objects of the disclosure will be apparent upon consideration of the following detailed description, taken in conjunction with the accompanying drawings, in which.

DETAILED DESCRIPTION

Figure 1:
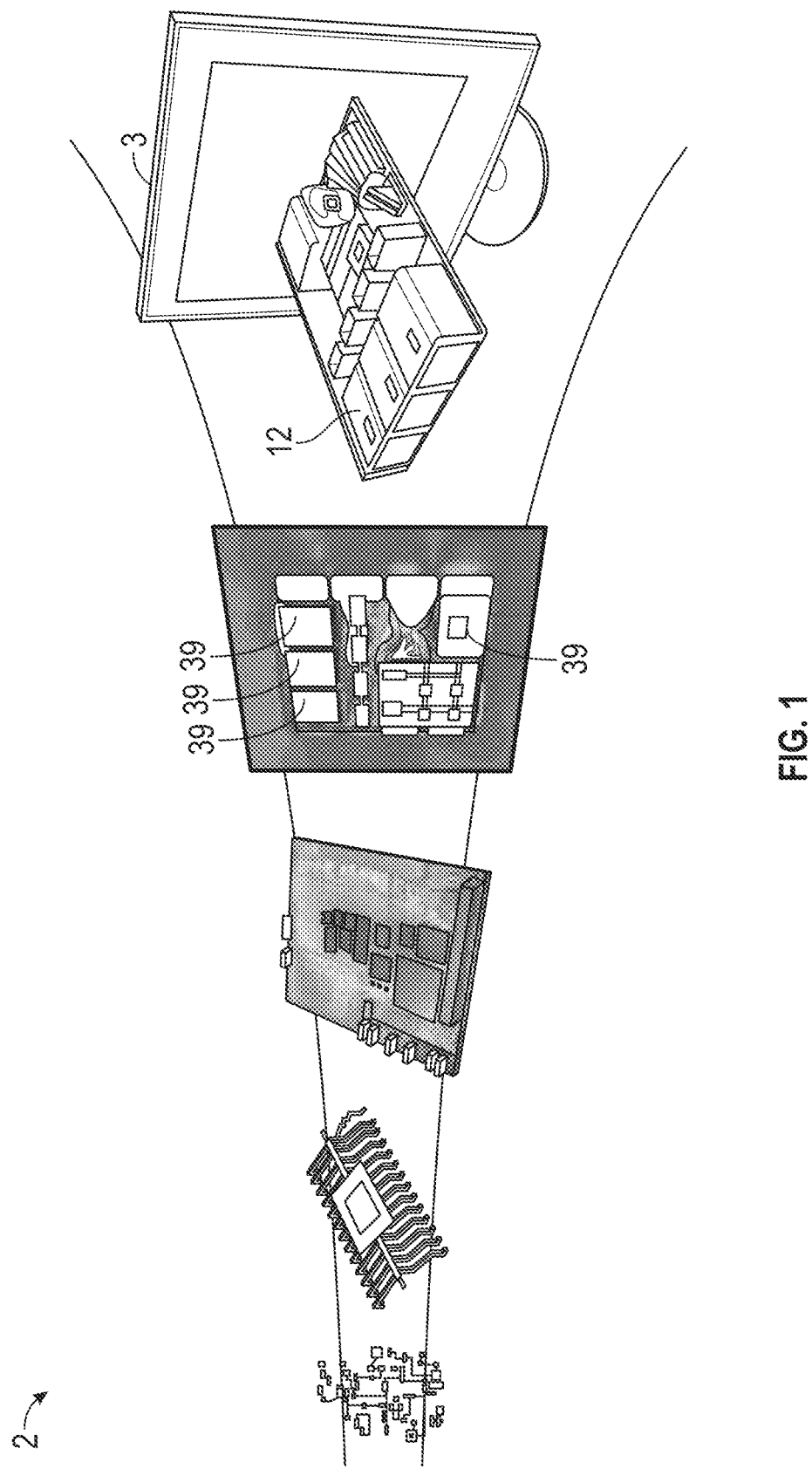
FIG. 1 is a schematic of an exemplary system of predictive semiconductor manufacturing in accordance with the present disclosure.

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations of the present disclosure.

As used herein, the "present disclosure" refers to any one of the embodiments described herein, and any equivalents. Furthermore, reference to various aspects of the disclosure throughout this document does not mean that all claimed embodiments or methods must include the referenced aspects. Reference to materials, configurations, directions, and other parameters should be considered as representative and illustrative of the capabilities of exemplary embodiments, and embodiments can operate with a wide variety of such parameters. It should be noted that the figures may not show every piece of equipment, nor the materials, configurations, and directions of the various circuits and communications systems.

FIGS. 1-4 illustrate exemplary embodiments of a predictive multi-planar semiconductor manufacturing method 1 and system 2. The systems and methods described herein calculate the most efficient, optimized multi-plane surfaces and shape of a microchip, according to the design and manufacturing process. The systems and methods analyze, calculate, and determine what would be the best 3D, multi-planar shape 12 to manufacture a chip according to the desired process dimensions.

Disclosed systems and methods include machine learning 43 and machine shape feature perception processes 21 to analyze 3D, MP shapes' characteristics, constructing them 27 and ranking them, enabling optimization and convergence of a manufacturing process into one optimal 3D, MP shape 55, and providing a prediction 73 of the best shape 55 for the process. Disclosed processes can handle huge data volumes (the 3D, MP shapes, which may be stored in a shapes data center 47), enormous computation, producing 3D, MP statistical models that are evaluated for optimal semiconductor wafer manufacturing. Thus, advantageously, if a chip design firm wants to design and manufacture a microchip in 3 nm node, for example, disclosed systems calculate and predict, using AI analysis and mathematics, what would be the best multi-planar shape 55 to design and manufacture in this process, with optimal area utilization.

Figure 2:
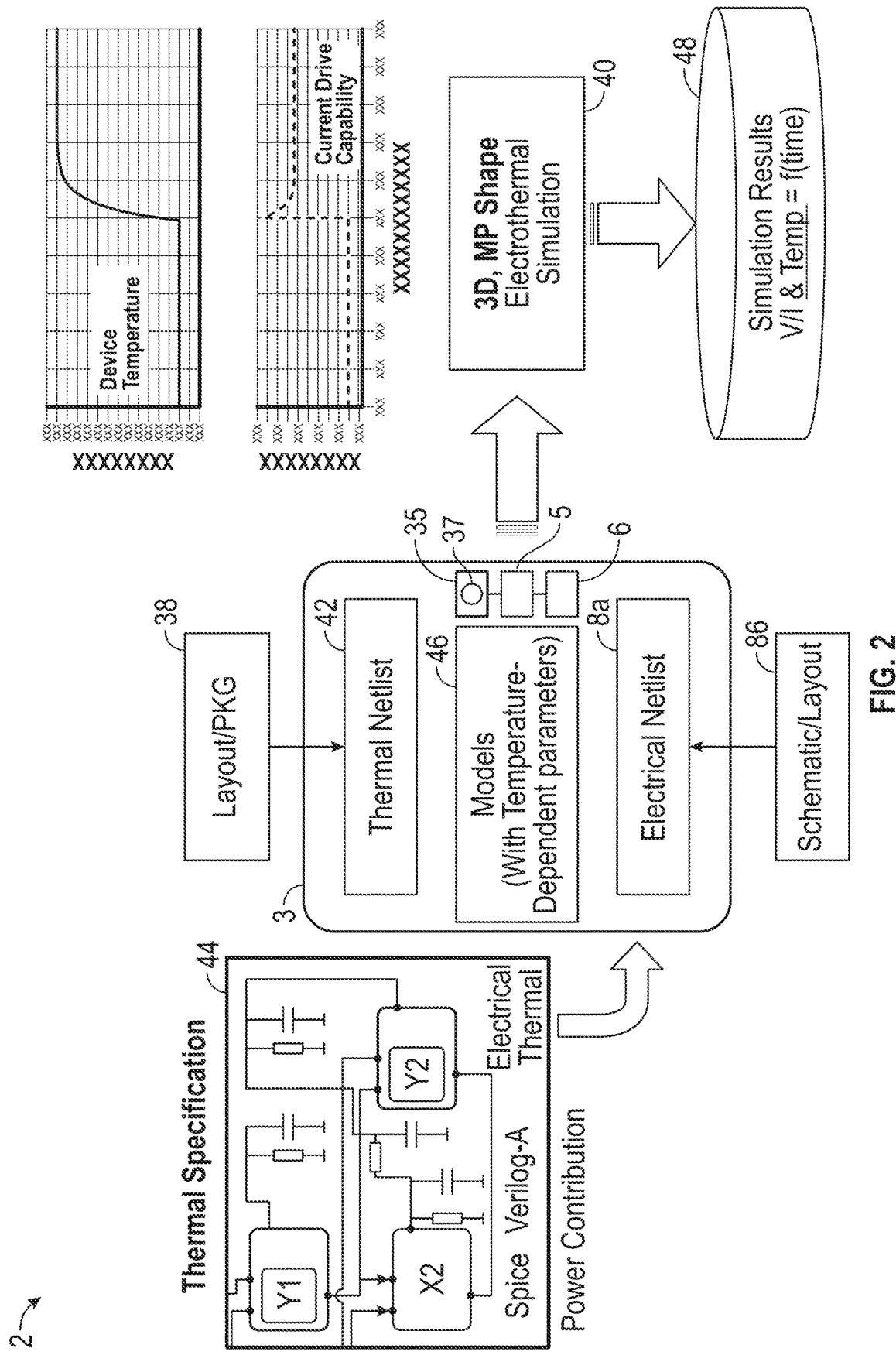
FIG. 2 is a schematic of an exemplary system of predictive semiconductor manufacturing in accordance with the present disclosure.
Figure 3:
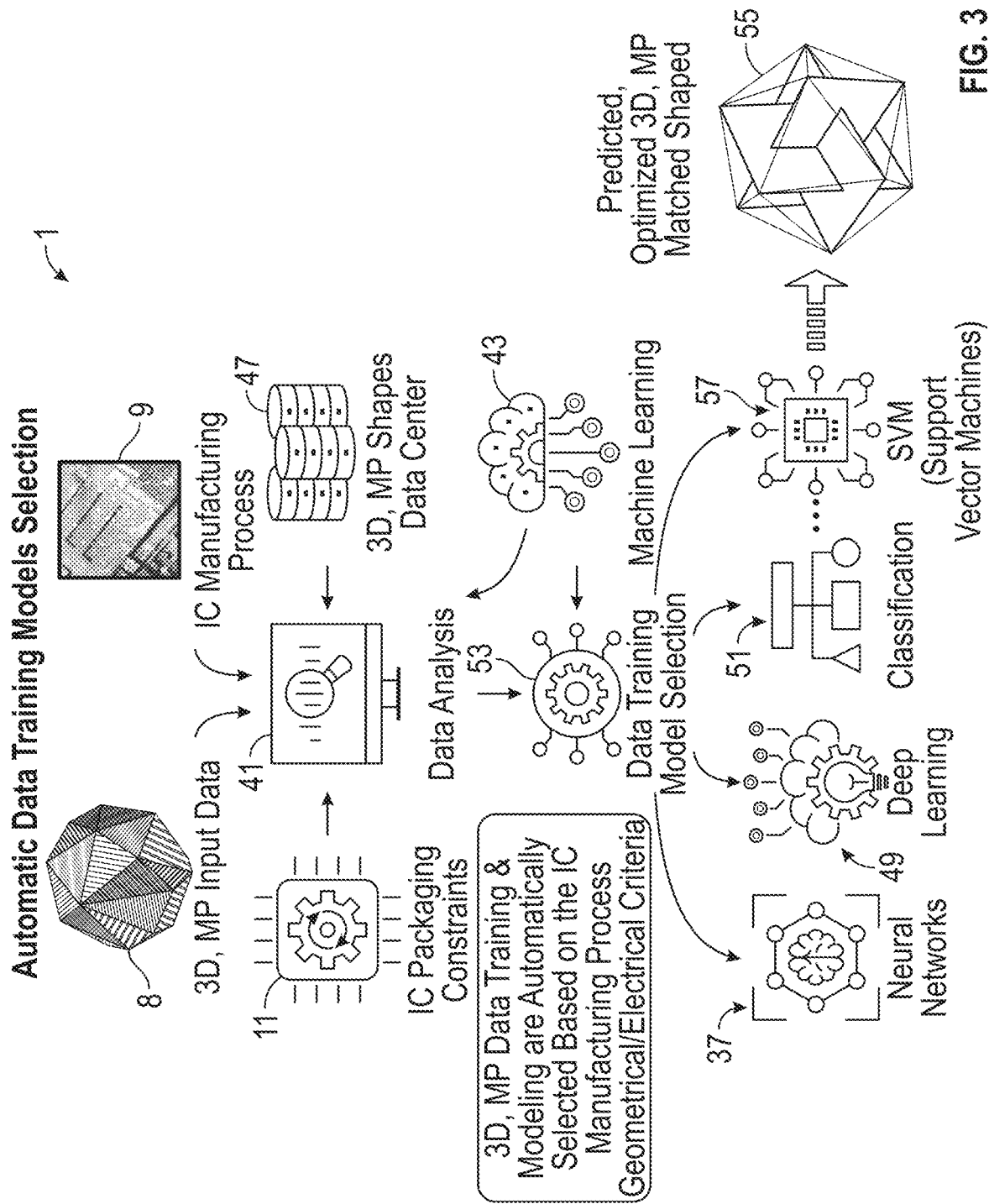
FIG. 3 is a schematic of an exemplary method of predictive semiconductor manufacturing in accordance with the present disclosure.
Figure 4:
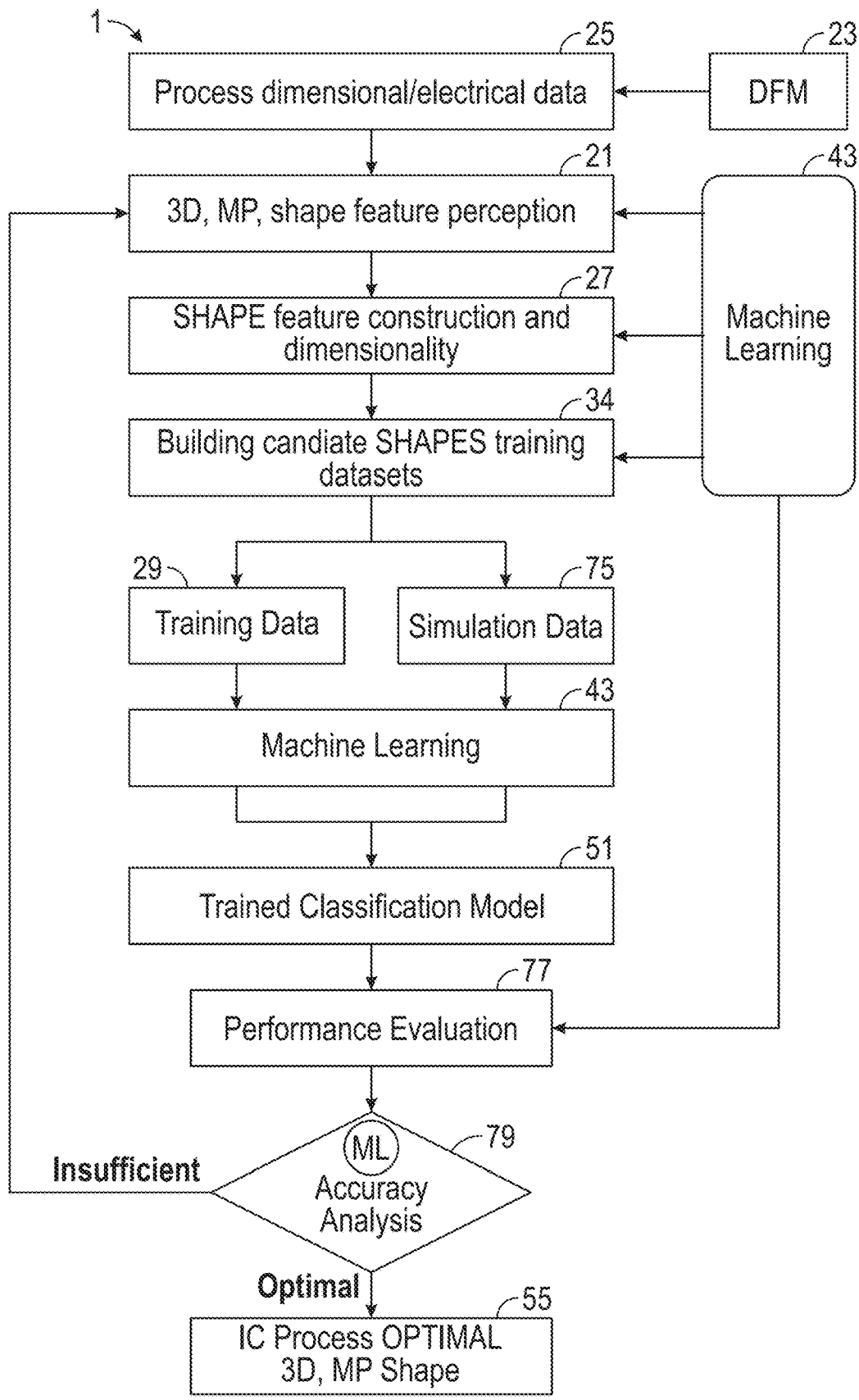
FIG. 4 is a process flow diagram of an exemplary method of predictive semiconductor manufacturing showing simulations trying multi-planar shapes in accordance with the present disclosure.

As illustrated in FIG. 2, an exemplary computer-implemented system 2 of predictive manufacturing includes a computer 3, a processor 5, a computer readable memory 6, and an artificial intelligence (AI) unit 35. The computer readable memory 6 contains processing instructions providing for data analysis 41, i.e., semiconductor/chip design analysis, as described in detail herein. The manufacturing system 2 receives and reads input data 8, which include IC design and manufacturing process rules for the user's desired semiconductor and other 3D, MP data. These rules may be provided via a netlist 8a and/or external constraints file, and a schematic 8b showing semiconductor layout can be input into the system.

In exemplary embodiments, the system 2 characterizes design/manufacturing rules as the initial step, prior to the defining 3D, MP shapes 12. This is one of the key factors that gives the disclosed system 2 a great advantage. A series of initial analyses are done to categorize the types of geometrical cases that are going to be simulated. Each case is examined according to its geometrical (manufacturing), electrical connectivity and DFM rules. The system 2 catalogs each category according to its type and nature. Dependent categories are categorized in a special way to be handled within wider ranges of analysis later. After full categorization of the submitted area to be tested for design rules and manufacturing rules, a simulation starts, discussed in detail herein.

Disclosed systems 2 read all the microchip's design styles, including Analog, Digital, MIXED SIGNAL, RF, MEMS, memories, micro solar cells, and custom, semi-custom design styles. The systems and methods are not limited by process size and support all processes, e.g., processes as large a 350 nm and the smallest, 2 nm, with everything in between, including sizes such as 14 nm and 16 nm. The systems 2 and methods 1 support standard CMOS and advanced FinFet, GAA Fet (Gate All Around Fet) technologies.

In exemplary embodiments, a machine learning computer program (which may be part of the AI unit 35) reads the IC design and manufacturing process 9, taking into account 25 the process geometrical design/electrical data and rules, connectivity design rules, DFM rules 23, electrical and reliability rules, and models 46 including temperature-dependent parameters, if necessary. IC packaging constraints 11 also are considered and may be used in simulations to determine the most optimal packaging, as discussed in more detail herein. The system may use different machine learning methods 43 according to the microchip's manufacturing complexity and geometrical/electrical features. Additional data such as device temperature and current drive capability can be read by the program.

As the machine learning program processes the manufacturing node's complexities, (e.g., a 5 nm node is highly complex regarding geometrical and electrical design rules), thousands of geometrical rules (space, width, enclosure, etc.) and as many electrical rules (current densities, electromigration, IR Drop, etc.), it decides which AI modeling is best to use for fast, data-efficient processing, as each method is most effective for specific tasks.

It also reads the manufacturing process data 9 as provided by the fabrication plant, or foundry. Exemplary systems include the option to input integrated circuit fabrication plant apparatus data 9, e.g., sizes, manufacturing dimensions, and other related manufacturing apparatus information such as die layout 36 to take into account during the simulations and evaluations for the most optimal 3D, MP shape. Information relating to semiconductor package layout 38 also may be provided.

Figure 5:
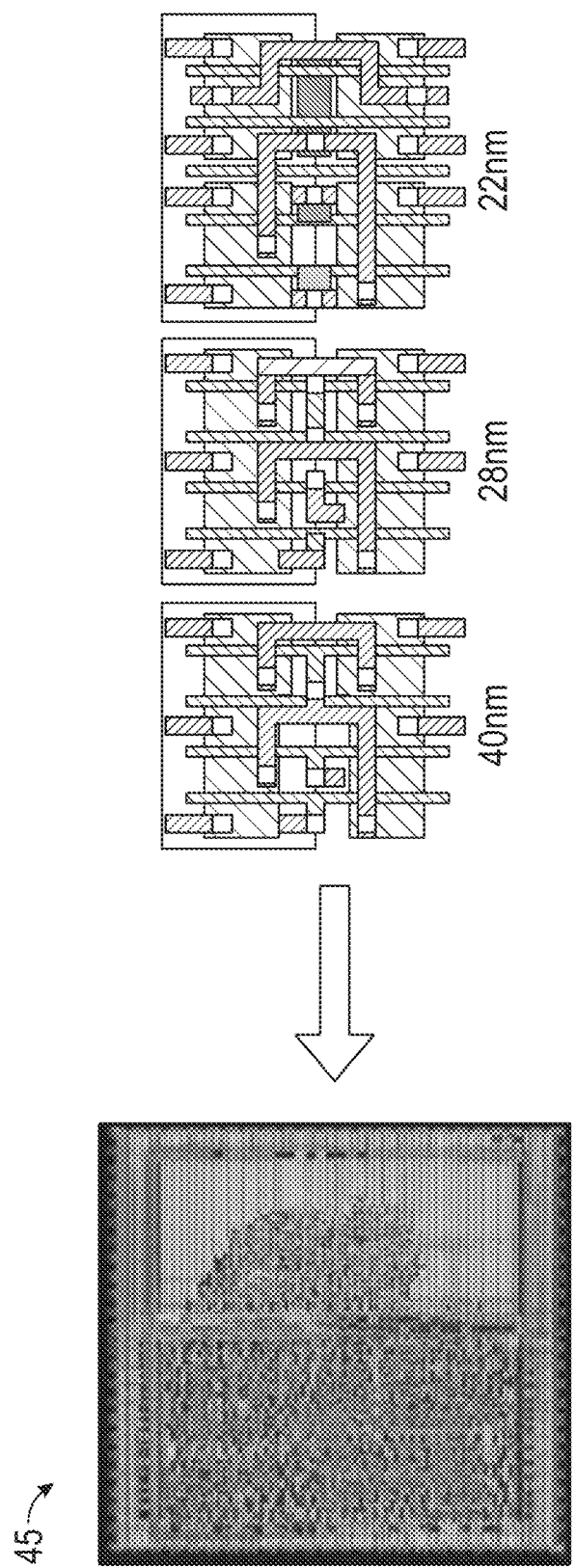
FIG. 5 is a schematic of an exemplary method of predictive semiconductor manufacturing showing standard cell allocation analysis in accordance with the present disclosure.
Figure 6:
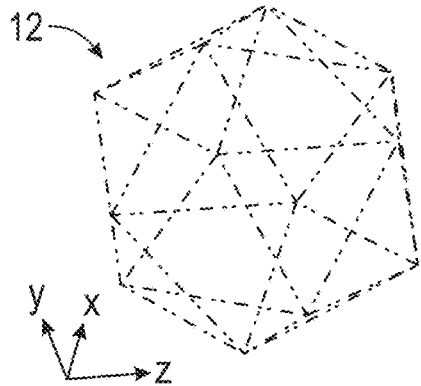
FIG. 6 is a front view of an exemplary predictive method of semiconductor manufacturing showing standard cell allocation analysis in accordance with the present disclosure.
Figure 6:
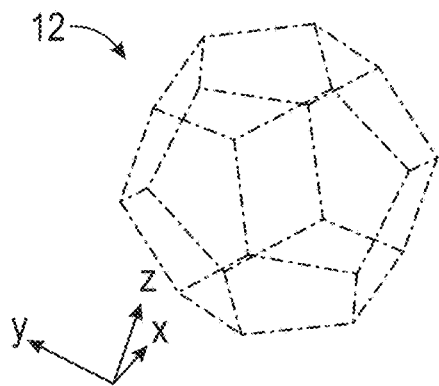
Figure 6:
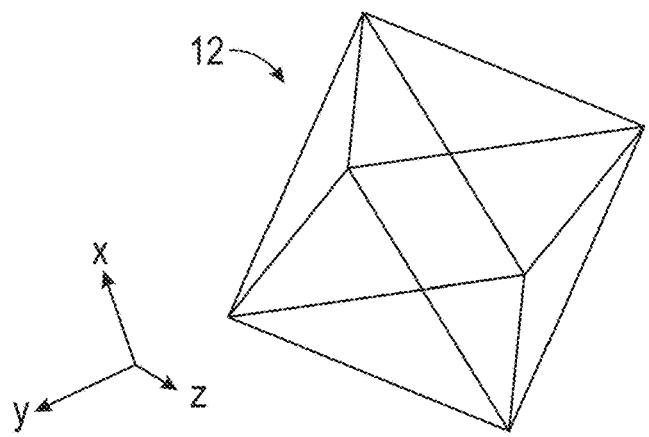
Figure 6:
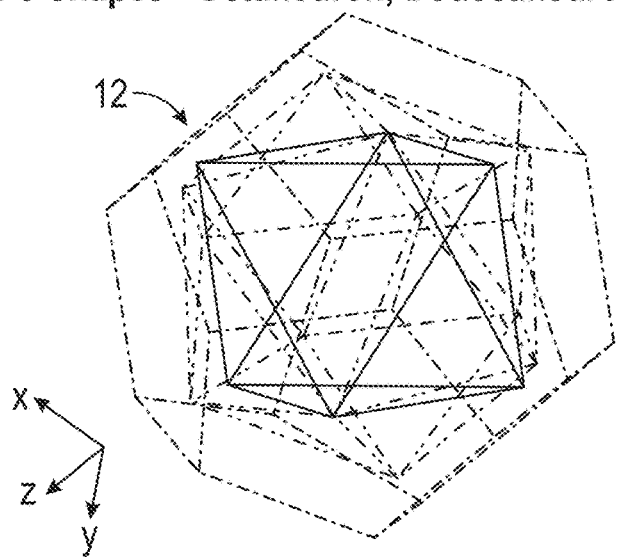
Figure 7:
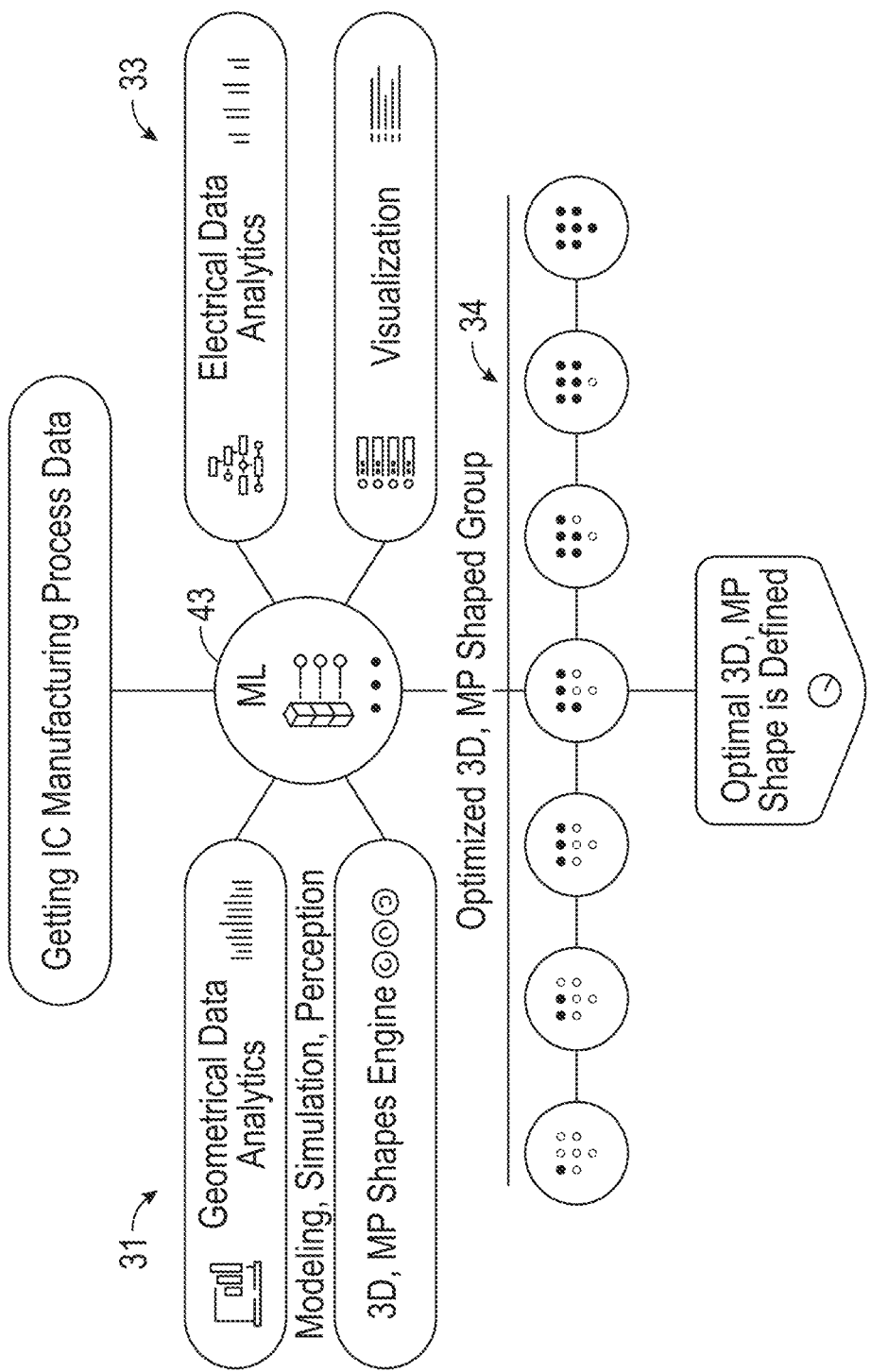
FIG. 7 is a schematic of an exemplary shape analysis by machine learning in accordance with the present disclosure.
Figure 8:
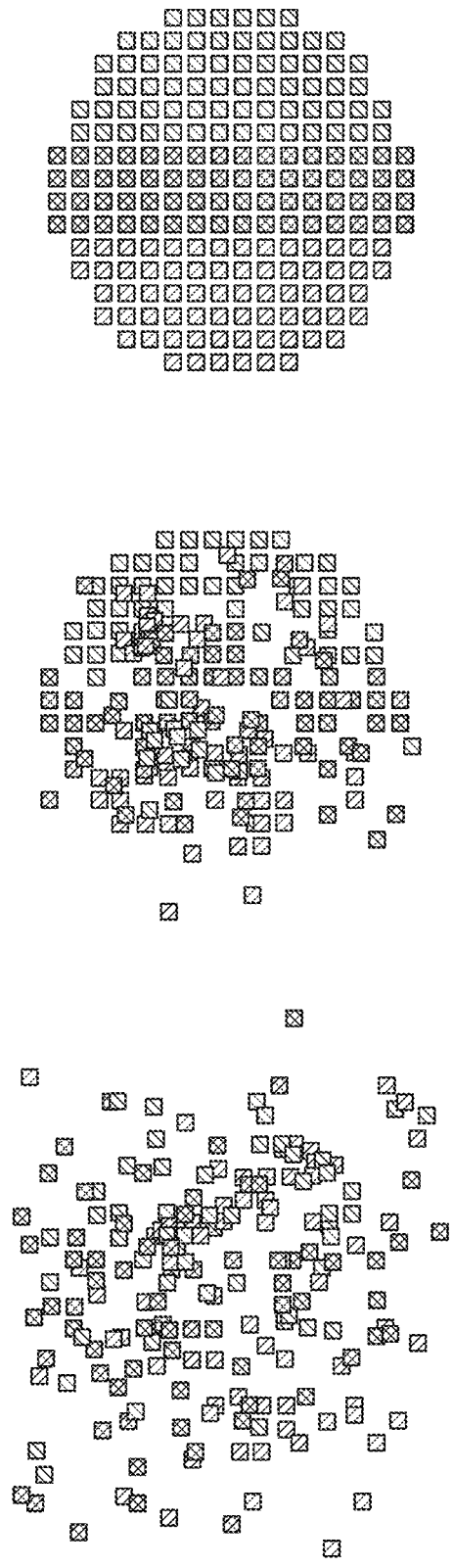
FIG. 8 is a vector schematic of an exemplary shape analysis by machine learning in accordance with the present disclosure.

It should be noted that the desired dimensions could be for a completely novel chip, or for an existing chip. Thus, a standard cell allocation analysis 45 illustrated in FIG. 5 includes mathematical processes to input data for an existing microchip in the format of GDSII or GDSIII (Oasis), and split it over 3D, multi-planar candidate shapes to recommend which one will be the optimal manufacturing choice for this microchip. This standard cell allocation analysis 45 means that IC design firms can choose ahead of time the optimal 3D, multi-planar shape to use for each individual chip according to its style, characteristics, and process. For example, as shown in FIG. 6, a dodecahedron is the best shape to design and manufacture chips in a 5 nm TSMC® process, and an icosahedron is the best shape to design and manufacture chips in a Samsung® 3 nm process. The system can take into consideration special microchips and their unique specifications, including but not limited to, RF communication chips, AI chips, CPUs, GPUs, Memories and MEMS. The system accommodates during its calculations and simulations.

In exemplary embodiments, the artificial intelligence unit 35 includes one or more neural networks 37 configured to mathematically model an IC manufacturing process, according to its geometrical and electrical characteristics, simulate it for the optimal results, and decide about an optimal three-dimensional, multi-planar shape to be fabricated on a semiconductor wafer. Exemplary neural networks 37 are self-trained via mathematical processes to create and test shapes based on training data 29. Thus, a neural network running a simulation would create multiple three-dimensional, multi-planar shapes starting with the simplest shape (i.e., tetrahedron) and increasing the number of surface planes to more complex shapes until reaching the highest shape that is possible for manufacturing.

Shape analysis 101 by machine learning and classification processes 103 are at the heart of disclosed predictive manufacturing methods. With reference to FIGS. 4 and 7-10, machine learning 43 and machine perception processes analyze 3D, MP shapes' characteristics, ranking them, and building possible match scenarios with an optimized 3D, MP shape group 34, or candidate shapes 12a-12j.

AI processes are activated to analyze possible IC layout shapes in conjunction with multi-planes structures, covering the wide range of the process's design rules. These processes may be divided according to category's type. For example, the CONNECTIVITY category requires a specific method to identify electrical connections between polygons according to the correlated rules. As the system analyzes the IC layout region for CONNECTIVITY it considers the GEOMETRICAL rules since both categories have to comply with the rules. These types of layout cases are considered extra complex due to the wide range of constraints that the system has to check.

DFM design rules belong to a separate category of geometrical analysis and therefore a dedicated method may be provided to address them separately. Design rule check is also performed on the 3D, MP shape to ensure a successful execution on the specific shape. If the DRC, LVS, RV, DFM checks are unable to produce "clean" (Pass) results then the shape is canceled and declared not a match for the process. In this way, only PASSED shapes are introduced for further analysis.

An exemplary space check of a specific layer is equivalent to a width check on the inverse of such a layer. Other types of checks, such as minimum overlap, can all be transformed to width check in a similar way. This does not mean, however, that the system has to transform the design to these intermediate forms before checking these rules. Instead, when multiple layers are presented, all rules and derived rules that are associated with these layers can be checked simultaneously. The manufacturing rules check is also defined as a local problem in adjacent regions. This locality is utilized by means of pattern matching on a two-dimensional area.

In an edge-based approach (described in detail herein), this locality is utilized by processing only adjacent true edges along an advanced, proprietary sweep line mechanism. This is also true in the disclosed edge-endpoint-based approach. Here adjacency not only refers to the adjacency within one layer, but among different layers and derived layers that are related via electrical connectivity, RV and DFM conditional rules as well.

An exemplary list of the parameters involved in shape analysis is shown here:

---
Vdd: 0.5-1 v
Temp: 0-120 C.
Freq.: 2.4-2.5 G
Technology: CMOS
Process: 7 nm FinFet
Electrothermal Analysis
---

A performance evaluation 77 run as part of the shape analysis 101, which may include cross-section analysis (FIG. 9) and shape analysis (FIG. 10), determines the shape with the highest performance, highest surface utilization, etc. This enables convergence toward one optimal 3D, MP shape, providing a prediction 73 of the best shape 55 for the process. Exemplary methods may incorporate geometric deep learning 49 that learns an IC manufacturing node 59 geometrical and electrical characteristics complex data and performs geometrical data analytics 31 and electrical data analytics 33, creating graphs and multi-dimensional points.

Figure 9:
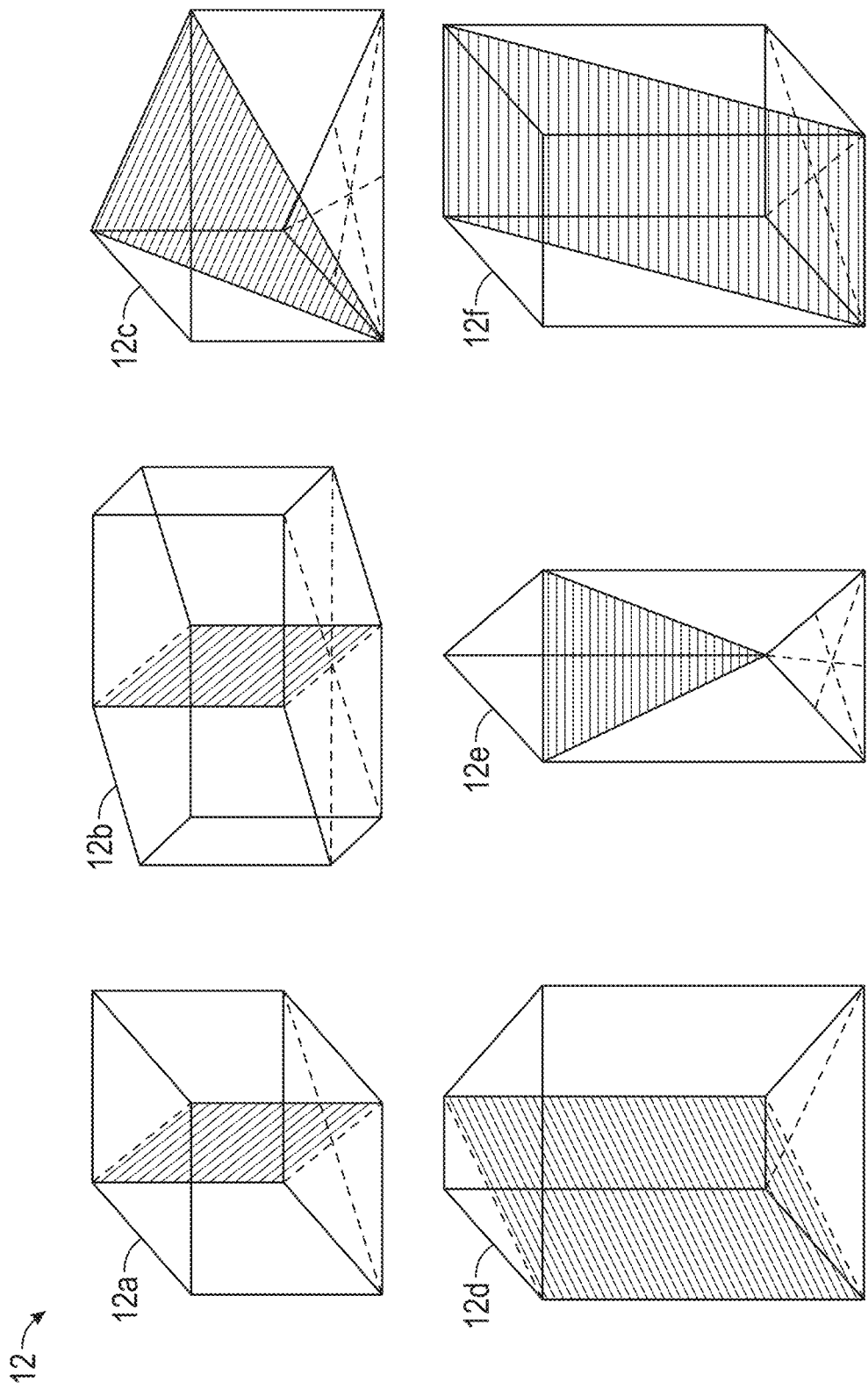
FIG. 9 is a front view of an exemplary system of predictive semiconductor manufacturing showing shape analysis of multi-planar shapes in accordance with the present disclosure.
Figure 10:
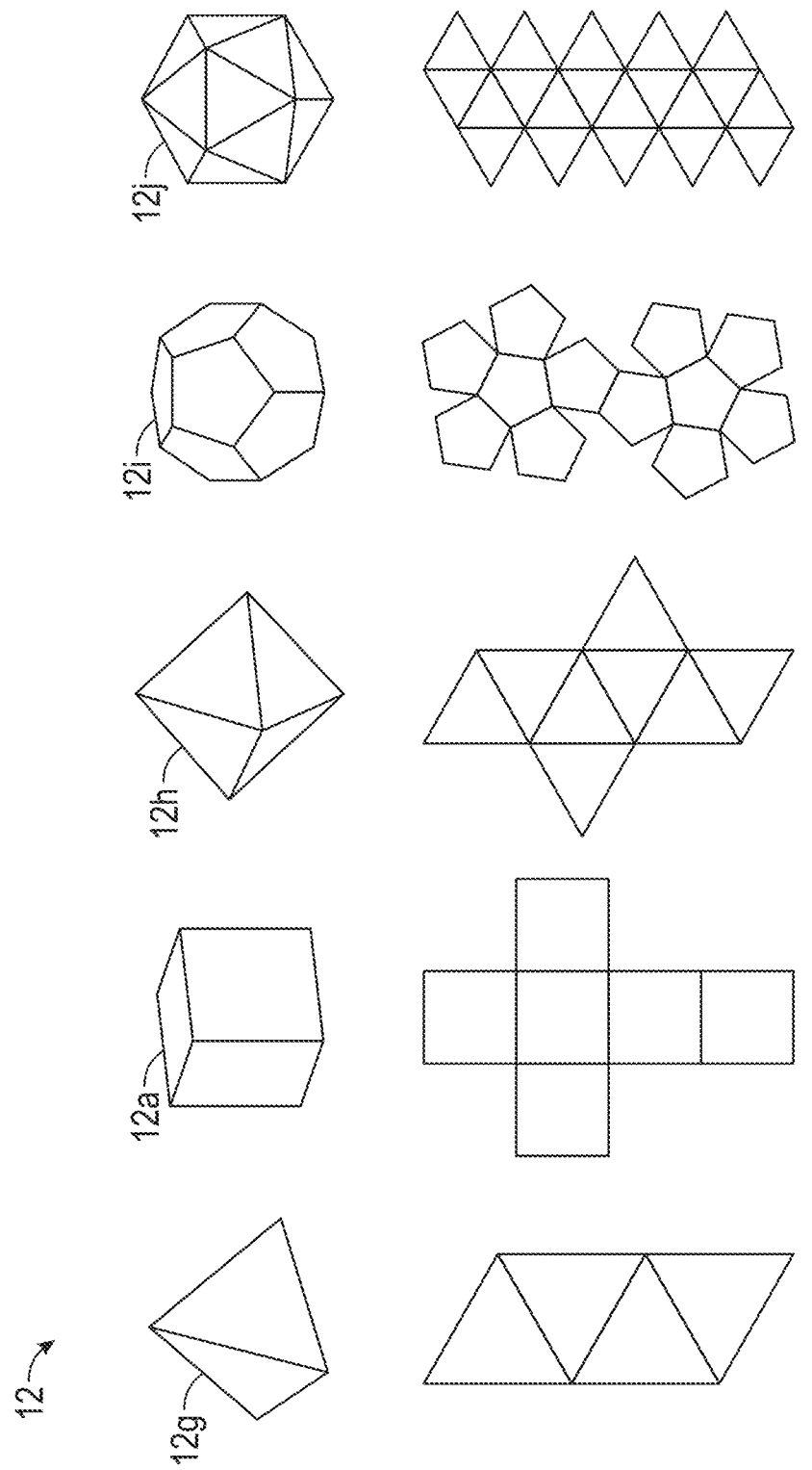
FIG. 10 is a front view of an exemplary system of predictive semiconductor manufacturing showing shape analysis of multi-planar shapes in accordance with the present disclosure.
Figure 11:
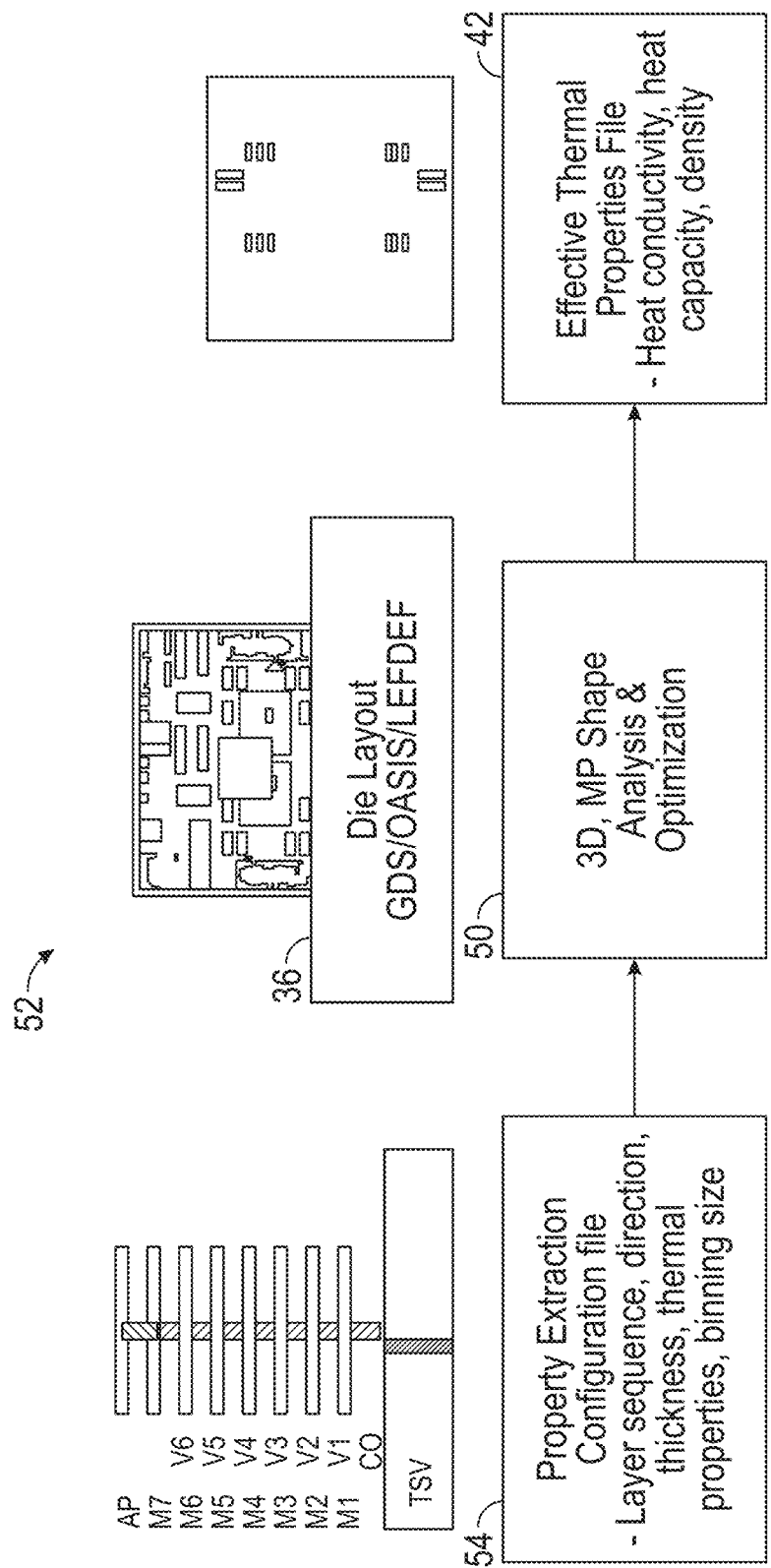
FIG. 11 is a schematic of an exemplary system of predictive semiconductor manufacturing running a simulation testing multi-planar shapes in accordance with the present disclosure.

After reading and analyzing the semiconductor design and manufacturing process rules and data and desired dimensions, the system runs a simulation 52, as illustrated in FIGS. 9-11, trying millions of multi-planar shapes 12 (those that the fabrication plant can make) and analyzing for the highest surface area yield. After the simulations, testing all shapes, and analyzing the simulation data 75, the system 2 will determine which is the best possible 3D, multi-planar shape to use to optimize surface area, obtaining the highest silicon yield, the highest area utilization, and/or the largest silicon surface area. In exemplary embodiments, the method 1 and system 2 also simulate the most optimal packaging to fit the selected 3D, multi-planar shape. The system can also take into account DFM (Design for Manufacturing) aspects to fit the selected 3D, MP shape.

Figure 12:
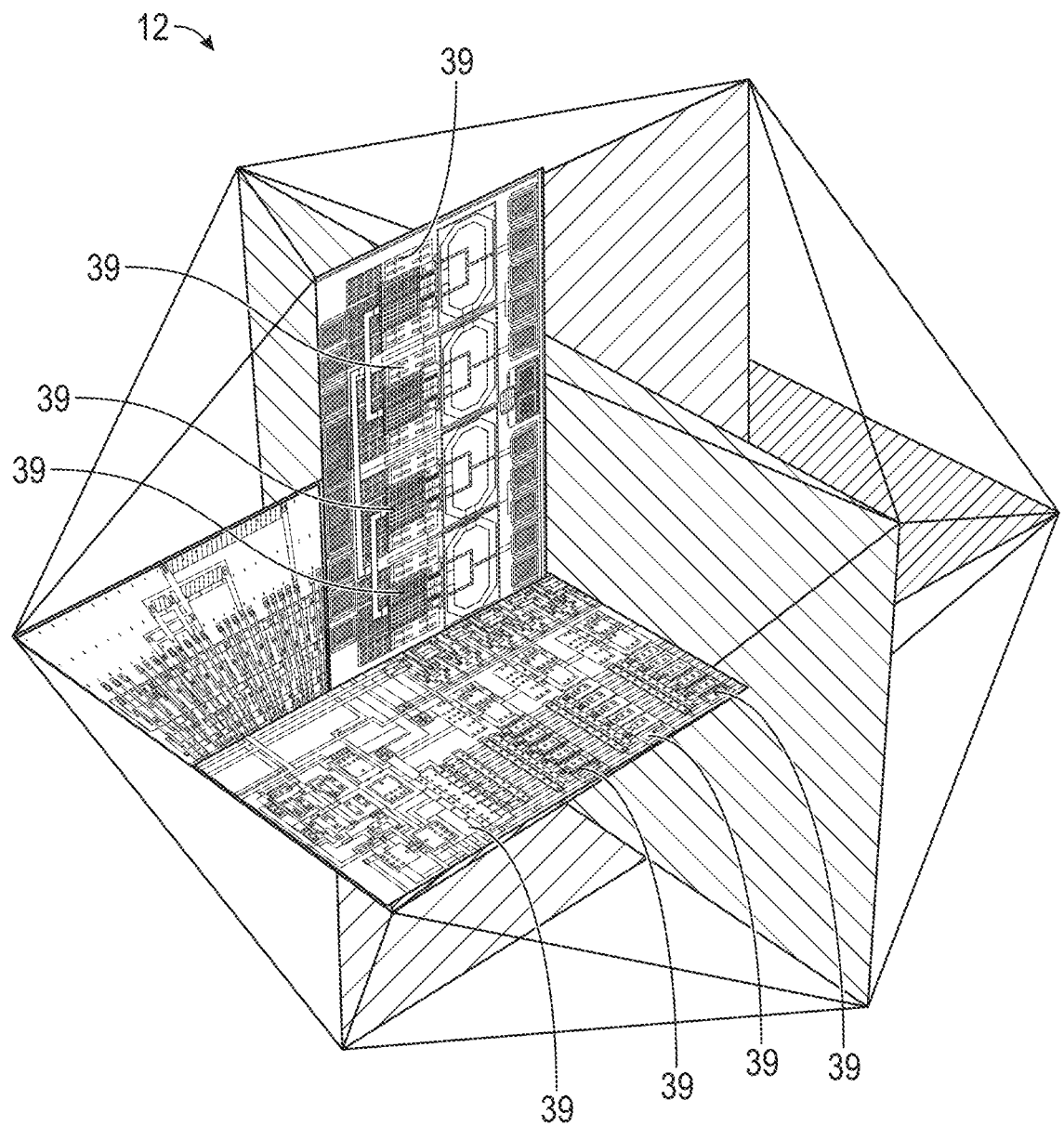
FIG. 12 is a perspective view of a 3D multi-planar shape with test chips on its surfaces and showing an IC layout match in accordance with the present disclosure.

As best seen in FIG. 12, the simulation 52 may include placing test chips 39 on the various shapes' surfaces. More particularly, the AI unit 35 with its neural networks runs a mathematical process to place dummy circuits/test chips 39 on the 3D, multi-planar shape's surfaces, taking into account the process's rules, analyzing the most optimized configuration and silicon area utilization using, among other information, data from a property extraction configuration file 54. The system 2 studies each shape and its area optimization capabilities according to the selected process.

Because of the use of neural networks, the system 2 has the cognitive capabilities to learn from experience and experiments that it conducts with time, to achieve the best results regarding process relevant area optimization, and the optimal model selection 53 to choose the best 3D, multi-planar shape to be chosen in each situation. FIG. 12 also illustrates an IC layout match, concluding the optimal shape for a specific IC manufacturing process (e.g., for 5 nm Geometris and electrical characteristics an ICOSAHEDRON is the optimal 3D, MP manufacturing shape).

Figure 13:
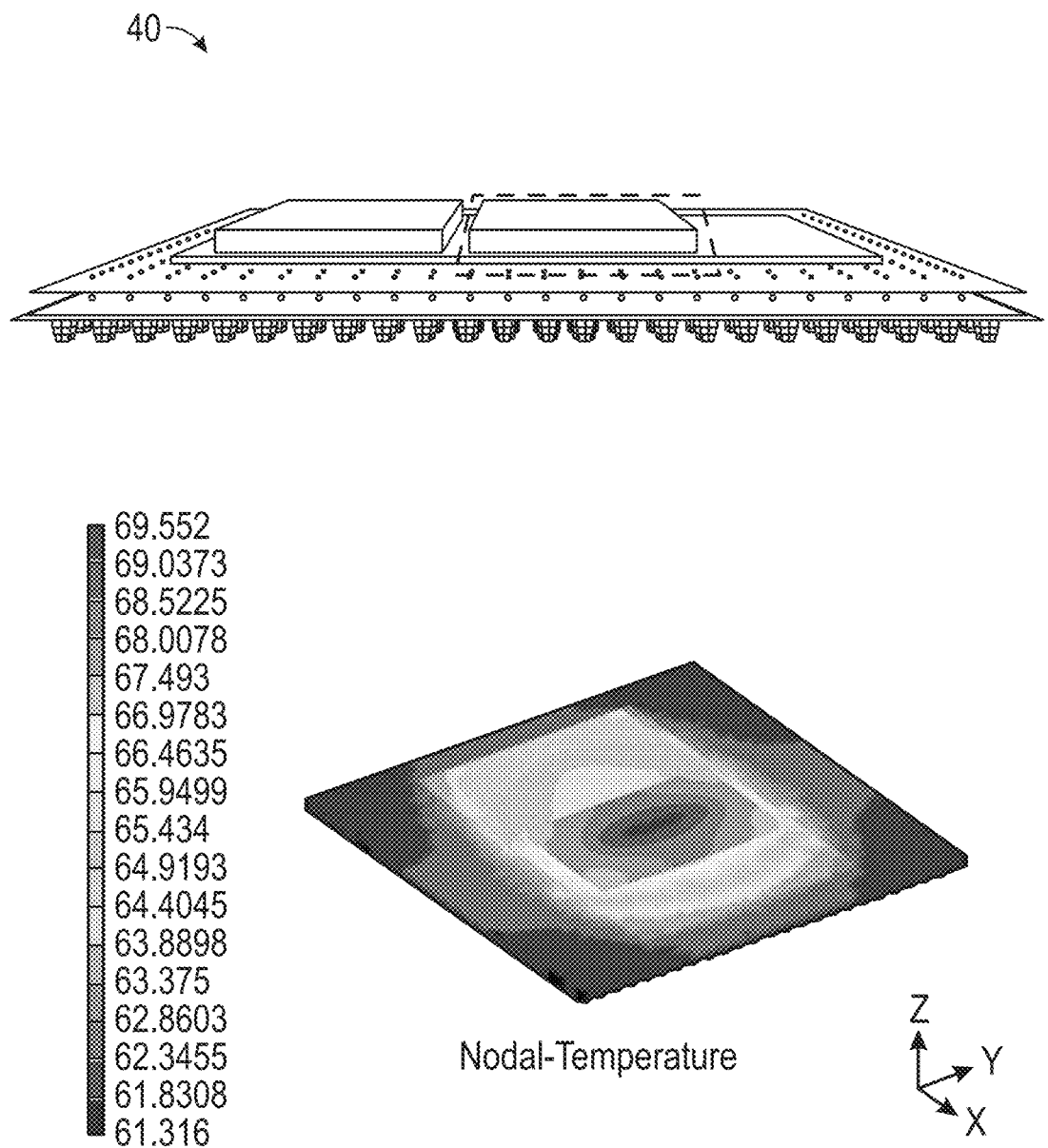
FIG. 13 is a schematic of an exemplary predictive method of semiconductor manufacturing showing electrothermal analysis in accordance with the present disclosure.
Figure 14:
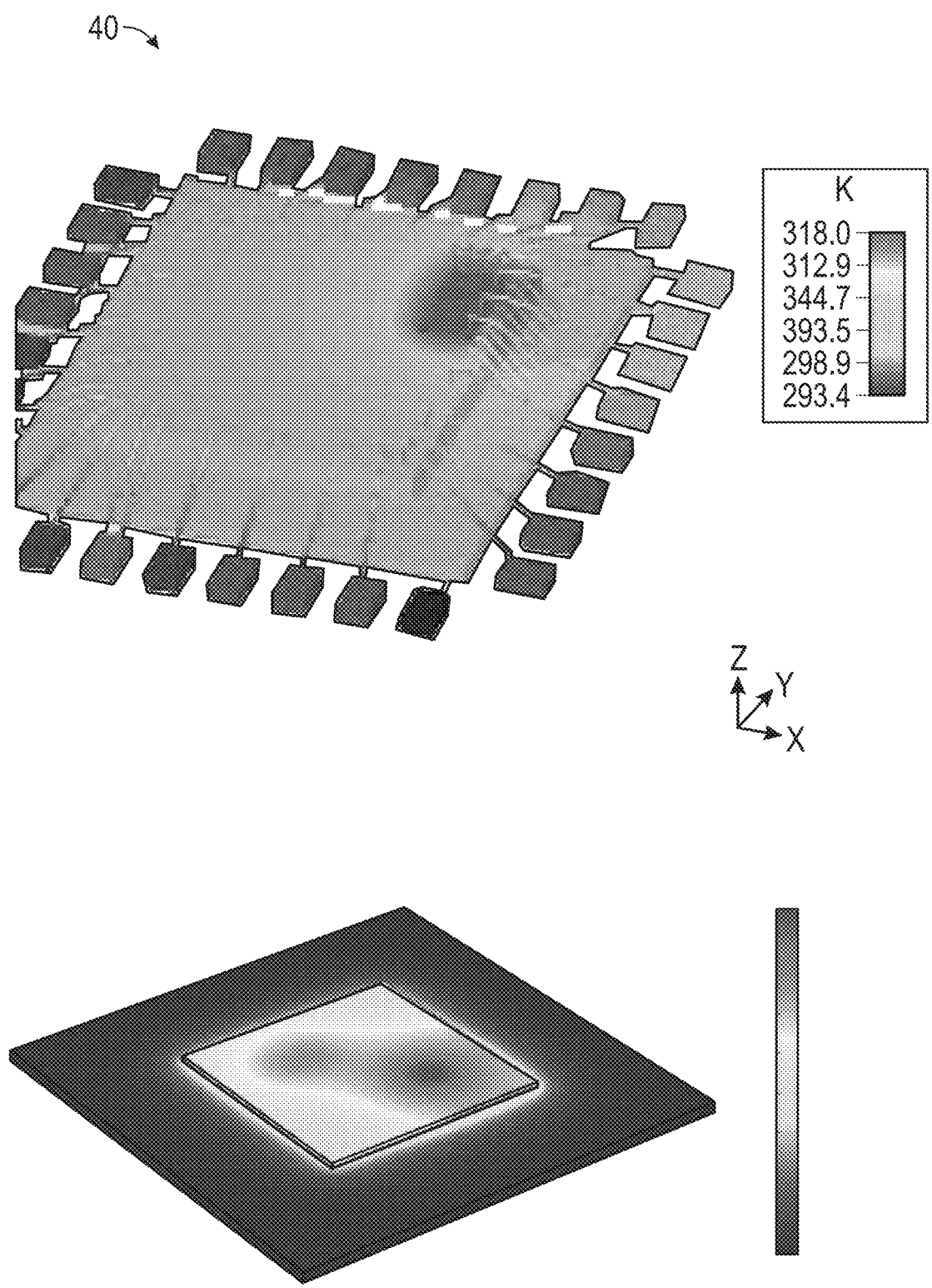
FIG. 14 is a schematic of an exemplary predictive method of semiconductor manufacturing showing electrothermal analysis in accordance with the present disclosure.

While simulating and testing for the optimal 3D, multi-planar shape, exemplary systems can run additional and alternative types of analyses. For instance, as best seen in FIGS. 13 and 14, the system 2 may perform an ElectroThermal analysis 40 of the 3D, multi-planar shapes during the simulations, and determine the best shape for the highest performance, yield, and manufacturing cost based on the simulation results 48. The data needed for this analysis may be provided by a thermal netlist 42 and thermal specification 44. An option to run a functional verification and performance optimization testing for a particular microchip may be provided. In exemplary embodiments, the system 2 includes a thermal analysis engine and electrothermal analysis engine.

The system 2 also can simulate the optimal thermal dissipation to test numerous 3D, multi-planar shapes and circuitry surface allocations to eliminate hot spots and recommend 56 the shape for best thermal dissipation and current flow along with the highest performance, highest surface utilization, and optimal thermal design. The system has the capability to test for electrical connectivity considerations such as IP Drop, Wire Coupling Capacitance, Cross Talk, Wires Resistivity, conductivity, and/or Reliability considerations like Electromigration, Self-Heat and Hot Electrons.

Figure 15:
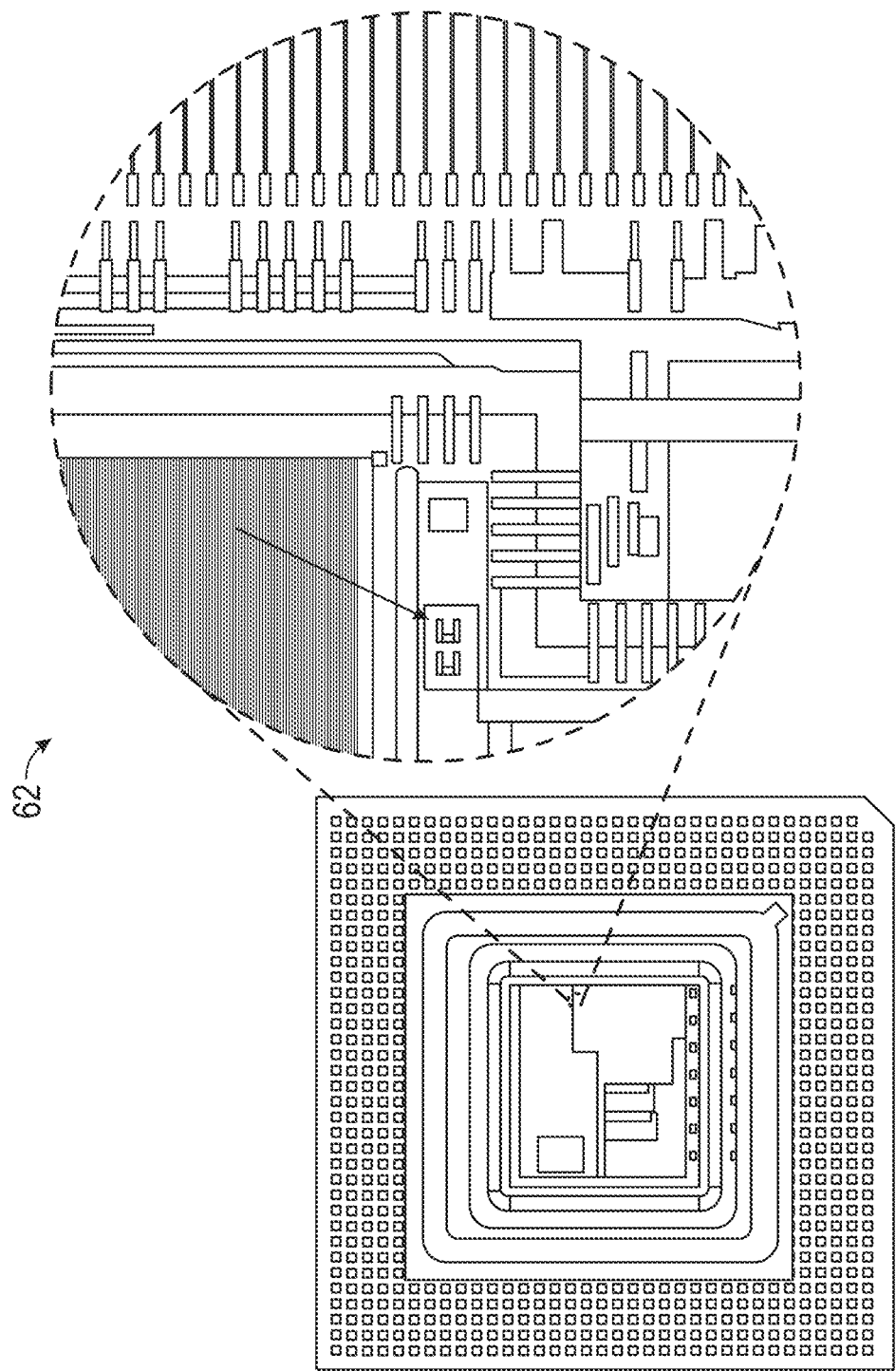
FIG. 15 is a schematic of an exemplary method of predictive semiconductor manufacturing showing micro and macro analysis in accordance with the present disclosure.
Figure 16:
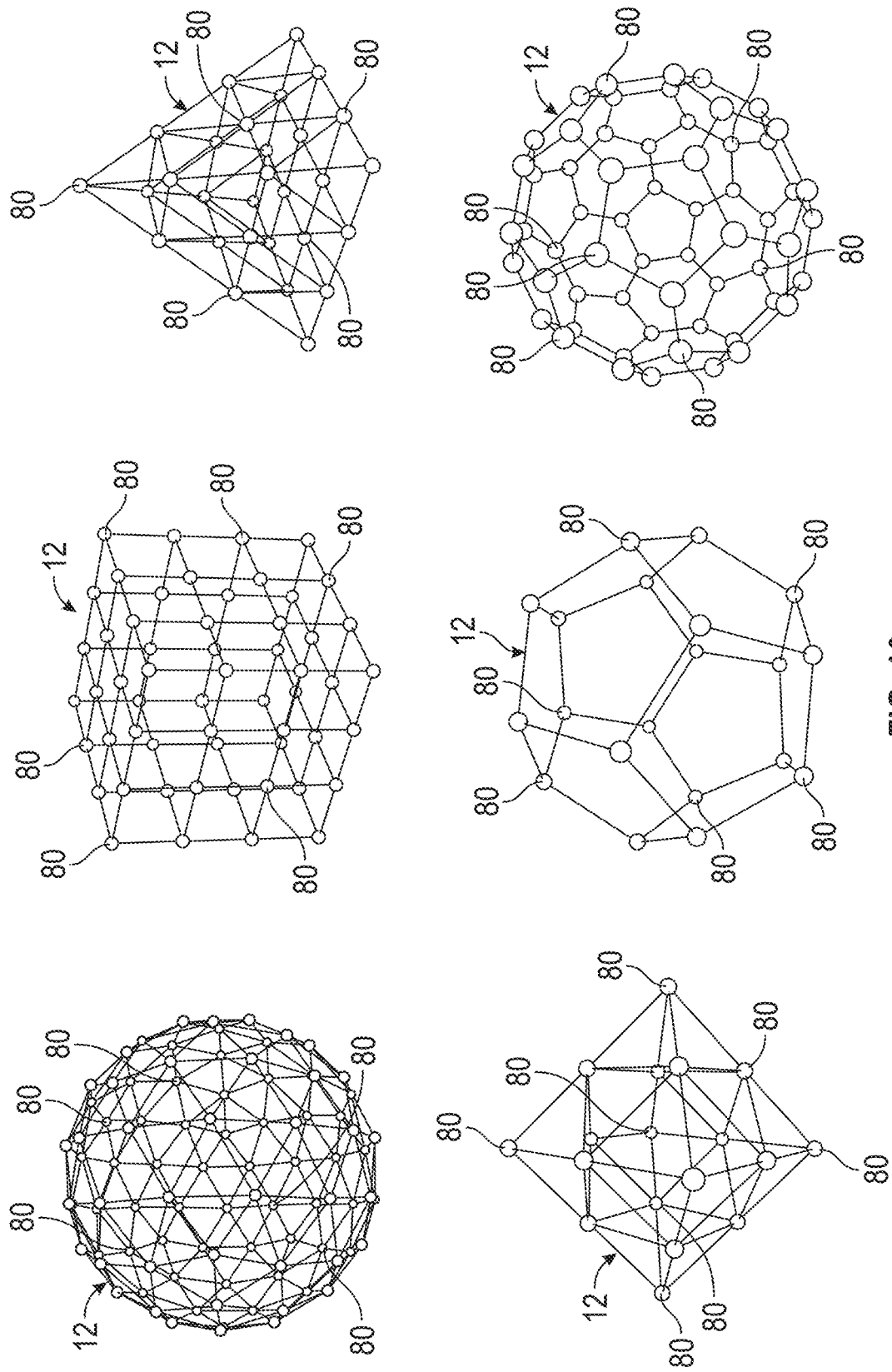
FIG. 16 is a front view of an exemplary system of predictive semiconductor manufacturing showing 3D multi-planar shapes described as unique, segmented data points in accordance with the present disclosure.
Figure 17:
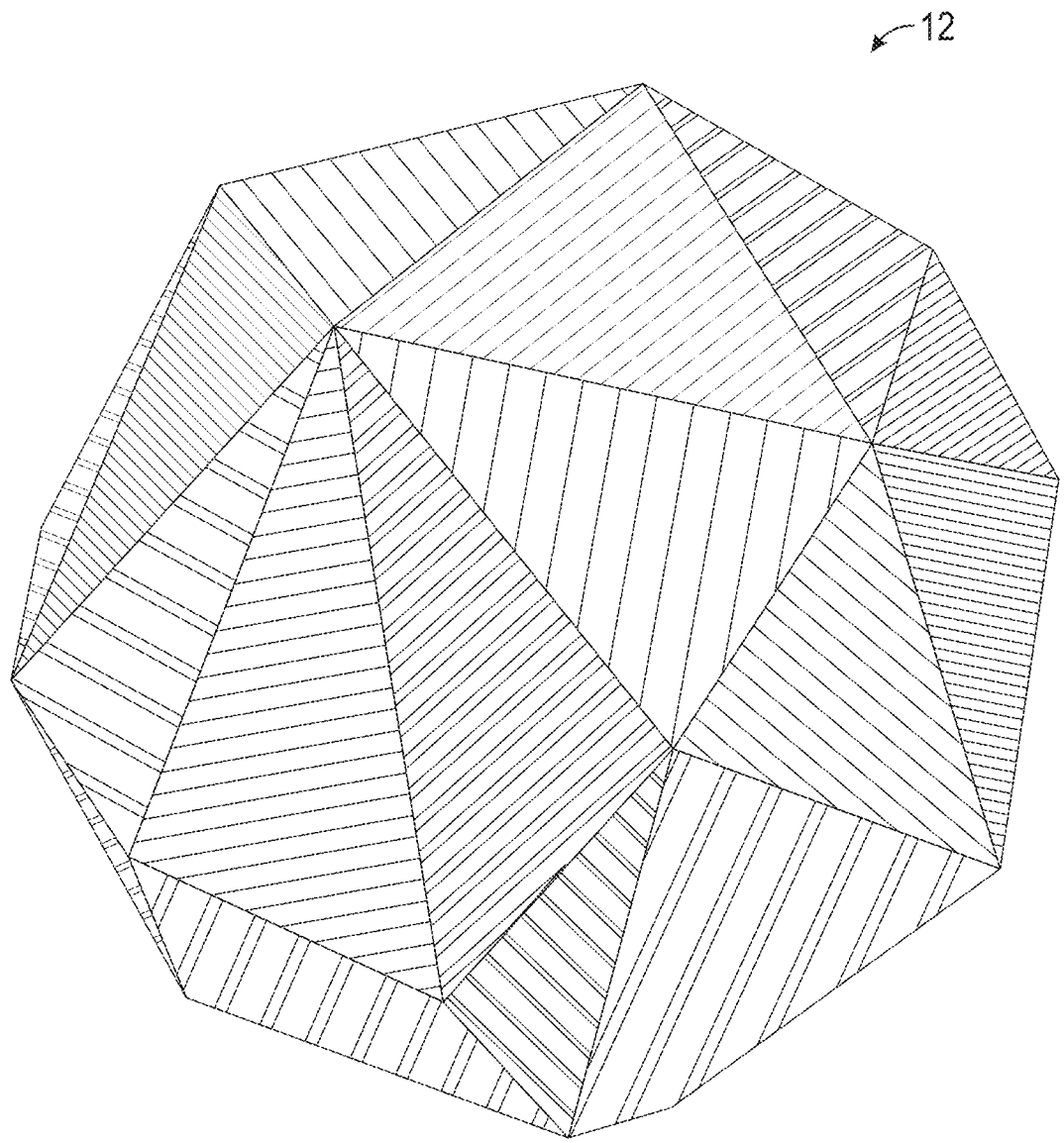
FIG. 17 is a front view of an exemplary system of predictive semiconductor manufacturing showing a multi-dimensional points assignment in accordance with the present disclosure.

After the simulation and various analyses, the system 2 constructs the three-dimensional, multi-planar shape that optimizes surface area. More particularly, the AI unit 35 performs 3D, multi-planar shape analysis and optimization 50 and then constructs a 3D, multi-planar shape that will optimize surface areas according to the physical manufacturing data. As best seen in FIG. 15, the shape analysis 62 may include both micro and macro analysis. In exemplary embodiments, as shown in FIG. 16, each 3D, MP shape is described as unique, segmented data points 80, creating a unique dataset for the machine learning model classification 51. FIG. 17 shows an exemplary multi-dimensional points assignment, where each plane is evaluated for optimal IC layout allocation based on the process geometrical and electrical design rules.

A support vector machine 57 or network may be provided to analyze the data for classification and regression analysis. The constructed shape, along with additional information, may be displayed on a computer screen or other user interface. A post-process machine learning accuracy analysis 79 may be performed, looking at the fraction of predictions the model made correctly. This ensures that the AI unit 35 and machine learning process and overall predictive manufacturing method 1 is functioning as needed.

Figure 18:
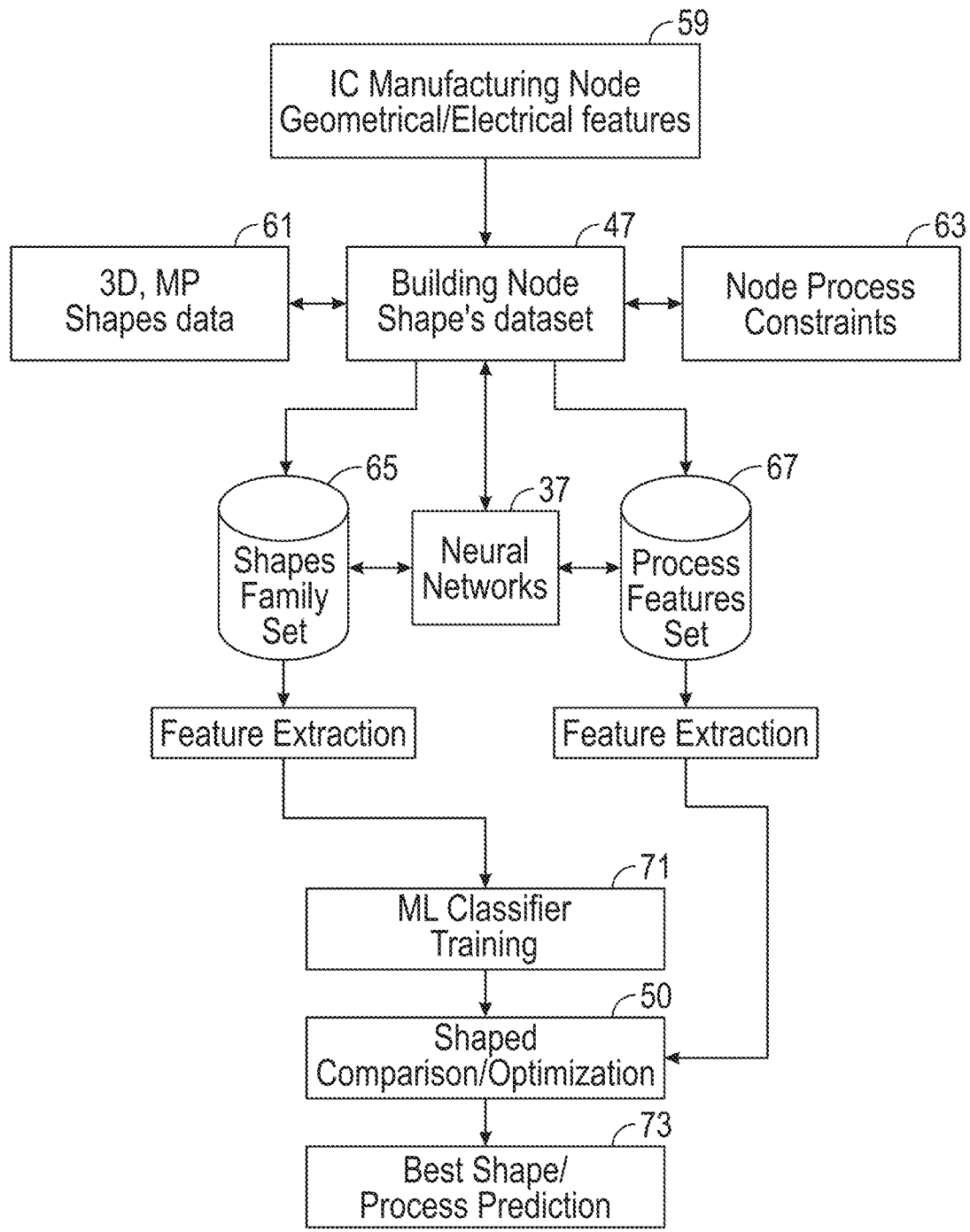
FIG. 18 is a process flow diagram of an exemplary system of predictive semiconductor manufacturing showing a shape classification flow in accordance with the present disclosure.
Figure 19:
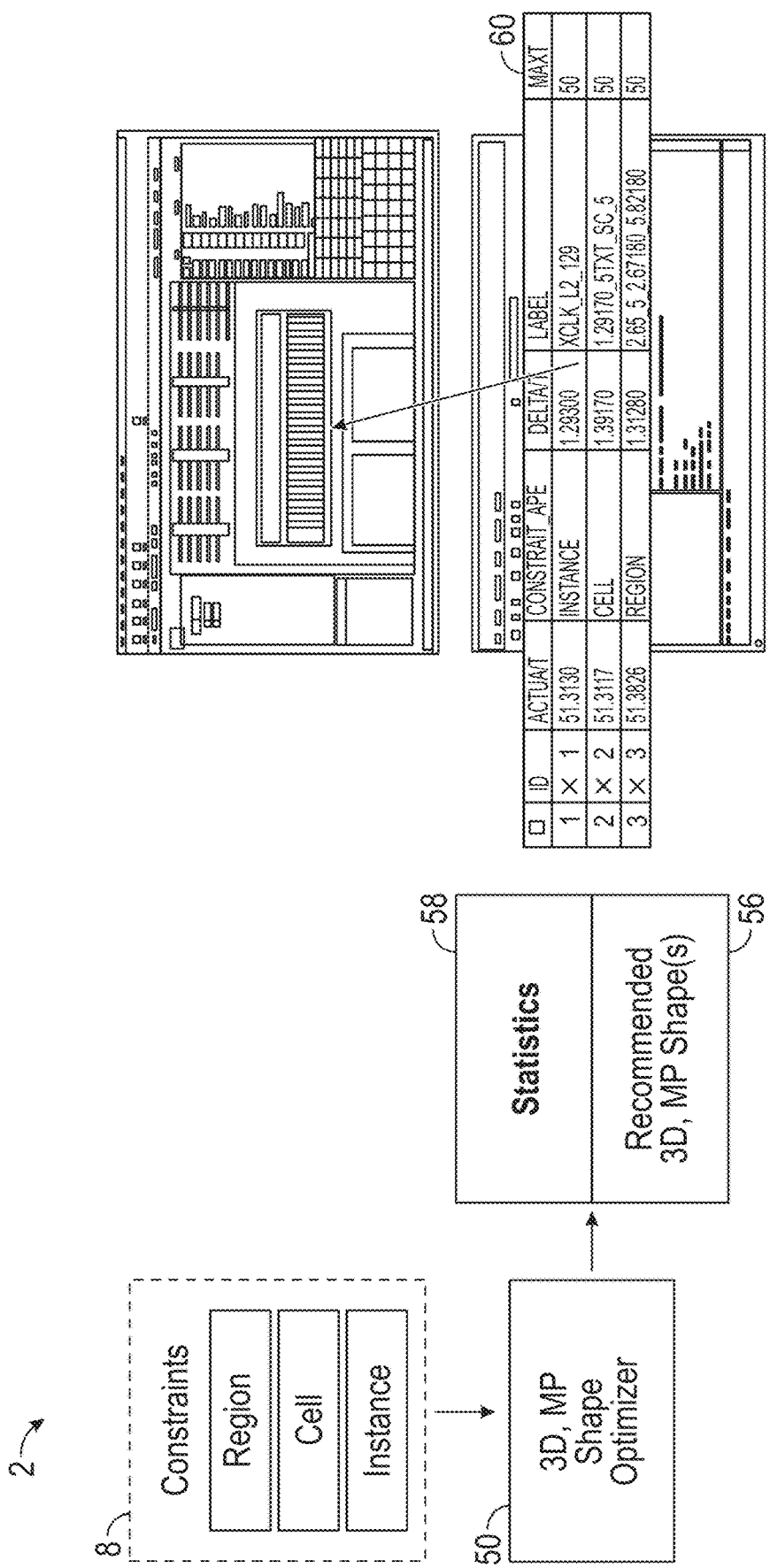
FIG. 19 is a schematic of an exemplary system of predictive semiconductor manufacturing showing various information provided via a graphical user interface in accordance with the present disclosure.

An exemplary shape classification 103 flow will now be described with reference to FIG. 18, though aspects of these processes are discussed in detail elsewhere. IC manufacturing node 59 geometrical and electrical features are fed into the building node shape dataset 47, which also takes into account 3D, MP shapes data 61 and node process constraints 63. The building node shape dataset 47 is in communication with the system's neural networks 37 as well as a shapes family set 65 and a process features set 67. Feature construction and dimensionality 27 may be comprised of feature extraction 69 from the shapes family set 65 and/or process features set 67 being performed. The extracted features are then inputted into machine learning classifier training 71 and/or used for shaped comparison/optimization 50. As discussed above, the ultimate output is a prediction 73 of the optimal 3D, MP shape.

Turning to FIGS. 19-22, an exemplary user interface will now be described. In exemplary embodiments, the system 2 provides a comprehensive, graphical user interface (GUI) 60 to present information to the user, including the chosen 3D, multi-planar shape in 2D, 3D and Flat layouts to the designers and fabrication plant personnel. For instance, the system graphically shows, on a computer 3 or other device screen the 3D, multi-planar shapes 12 along with pertinent statistics 58, including but not limited to, their analytics, simulation results, surface thermal maps 64 and thermal waveform 65, connectivity maps, and estimated yield area. Additional statistics 58, including silicon area utilization percentages for one or more of the three-dimensional, multi-planar shapes, may also be displayed on the GUI 60.

Figure 20:
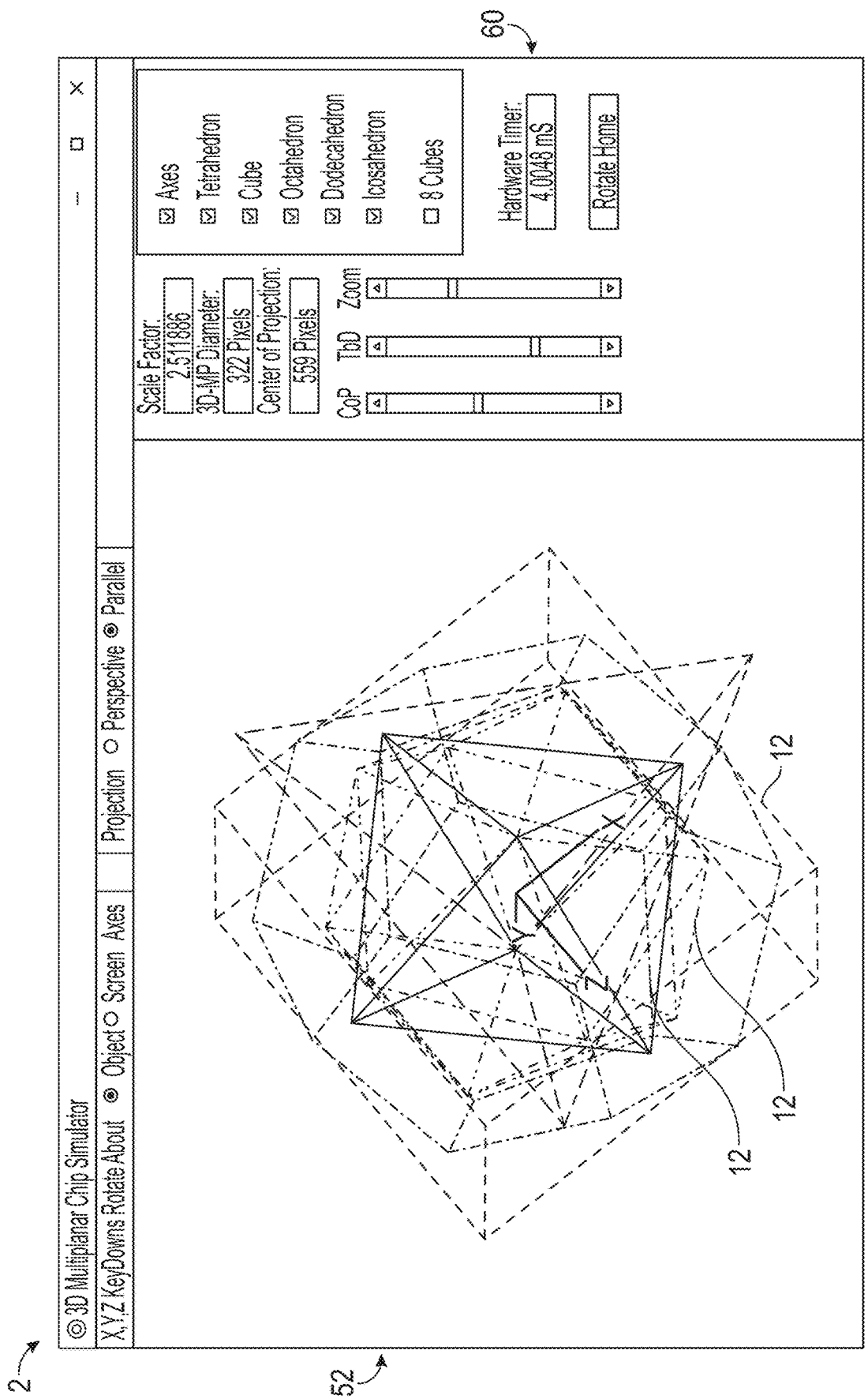
FIG. 20 is a front view of an exemplary system of predictive semiconductor manufacturing showing a graphical user interface in accordance with the present disclosure.
Figure 21:
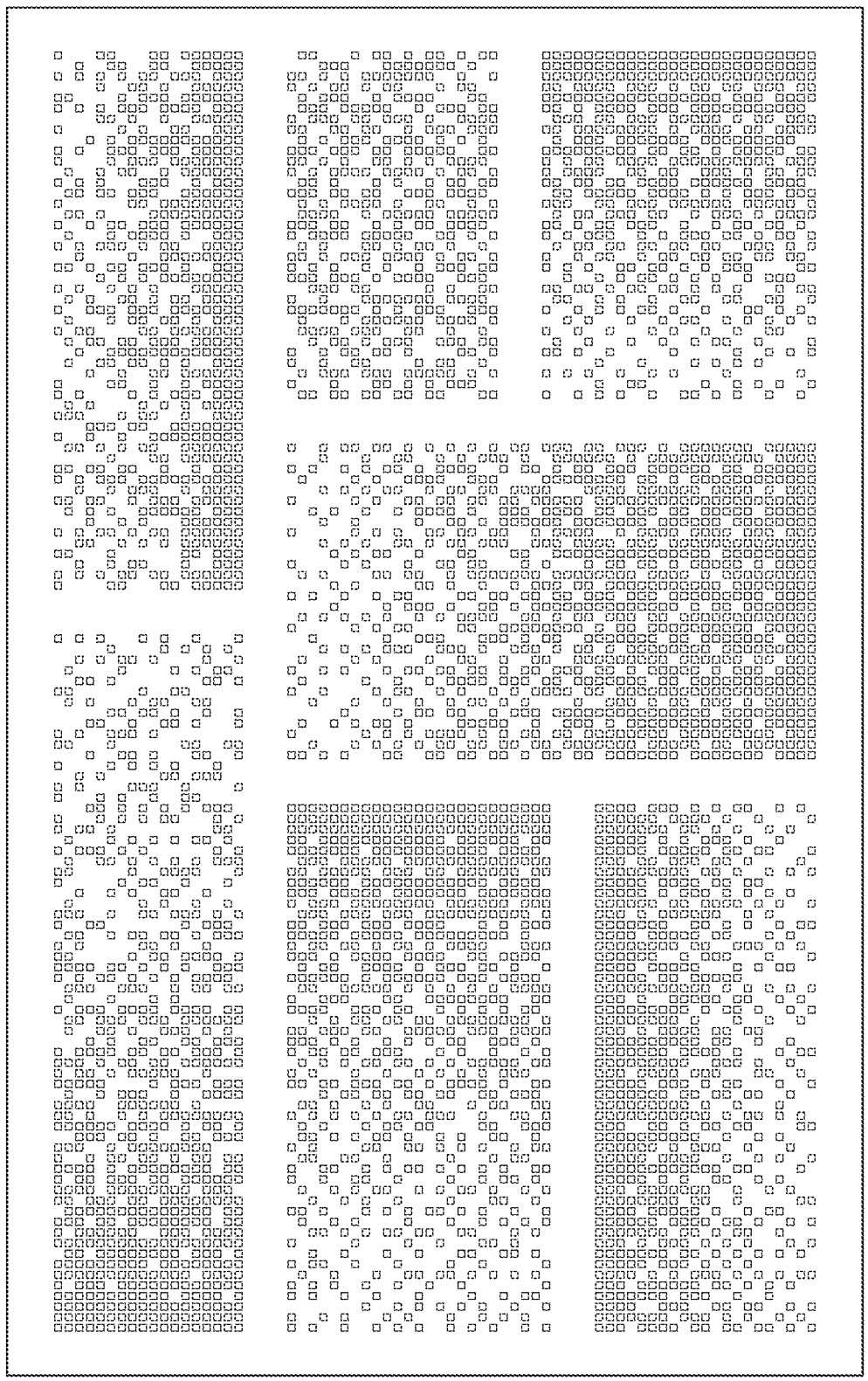
FIG. 21 is a front view of an exemplary system of predictive semiconductor manufacturing showing machine learning visualization in accordance with the present disclosure.
Figure 22:
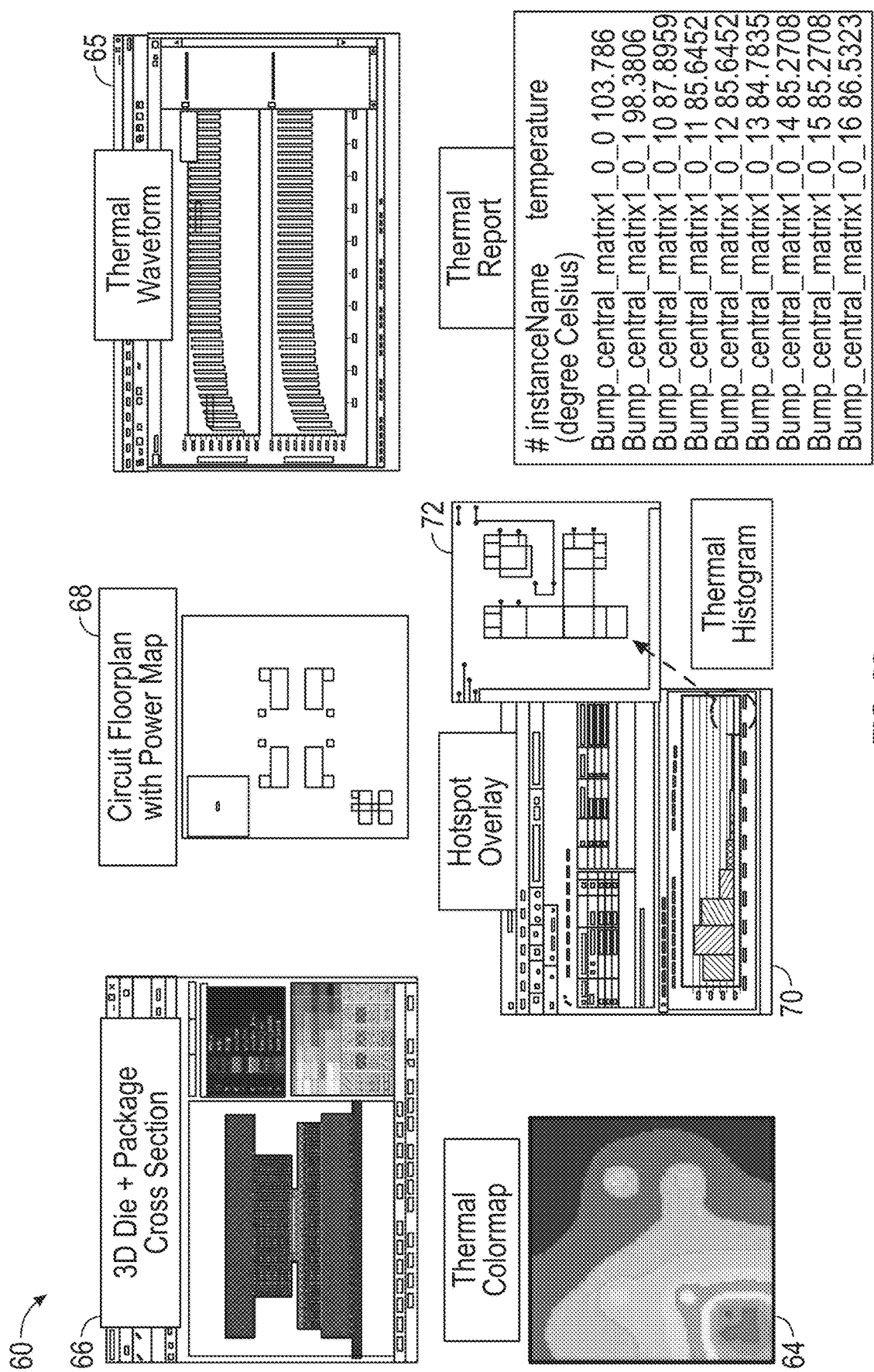
FIG. 22 is a front view of an exemplary system of predictive semiconductor manufacturing showing various information provided via a graphical user interface in accordance with the present disclosure.

As best seen in FIG. 20, comparisons of various 3D, multi-planar shapes 12 can be viewed on the GUI 60. The user can see multiple 3D, MP shapes 12 together on screen for observation and for the statistics, etc. described above. The system 2 creates a data-driven, computerized, graphical visualization of all simulated different 3D, MP shape possibilities, showing the final one as the conclusion along with the scientific reasons. An exemplary machine learning visualization is illustrated in FIG. 21. Manufacturing information, such as a 3D die and package cross section 66, also may be displayed. As shown in FIG. 22, the GUI 60 allows the user to see the circuit floorplan with power map 68, as well as a hotspot overlay 70 with a thermal histogram 72. A thermal report 74 with details from the thermal analysis also can be accessed via the GUI 60.

The system 2 can provide the silicon area utilization percentages and vital statistics in case a designer wants to select a particular shape according to performance and cost. Thus, design houses have the option to select the best 3D, MP shape for design and manufacturing according to their budget. For example, an IC design firm is interested to design a microchip for toys in 5 nm process. Choosing the optimal 3D, MP shape could make it too expensive, so the system can offer a cheaper alternative 3D, MP shape to design and manufacturing the microchip cheaper. The tradeoff might be slower performance for this chip, which may be acceptable since speed is not a critical feature.

In exemplary embodiments, the system includes a geometric engine that incorporates a few types of mathematical processes and methods to identify, categorize and analyze a wide range of design rule types. These processes generate numerous (billions), simulated dots that cover a 3D shape's plane area, aiming to analyze for the highest utilization yield for the manufacturing process IC layout. This process is repeated a sufficient number of times to produce an optimal estimation of the plane's area under ML analysis determination.

As discussed in detail herein, the system 2 uses a few types of proprietary, sweep line-based processes. In the system 2, all types of geometries can be analyzed. This approach was developed to cover complex process types, for advanced design styles like Analog, AMS and RF. The system 2 identifies all vertical, horizontal, angled and conic based process's layout objects using a fast access database engine. After rapid identification of the objects, they are fed into the geometrical engine (where the computational geometry calculations are done) for processing according to their attributes and characteristics. The system 2 defines a virtual analysis region that includes auto-generated layout structures. The geometric engine then performs a series of computations to analyze the region for manufacturing rules categories starting at the basic level all the way to the most complex rules. The geometric engine performs a wide range of Boolean and Metric operations, achieving accurate analysis to simulate a best process relevant match for 3D, MP shape.

The geometrical engine performs size-based operations to reach an optimal yield 3D, MP shape that is matched to the IC manufacturing process. Using a combination of Boolean operations and design rule type sizing operations, the overall plane area is calculated. This process requires a vast analysis of sizing an area-relevant Boolean operation for each plane's size, shape, and orientation. The process is very computing intensive and uses big data techniques to perform sizing/Boolean operations in an acceptable time.

Another feature that the geometrical engine performs is the plane's partitioning considering nearest-neighbor-plane information (shape, sizes, orientation). The most efficient plane's area is computed based on electrical connectivity area calculations, geometrical sampling, and design rule compliance (DRC, electrical, DFM, RV). Considering the process's electrical connectivity features strongly increases electrical performance, achieving best Electro-Thermal characteristics, and reliability, and ensuring the lowest power consumption.

In operation, a user feeds IC design and manufacturing process rules for their desired semiconductor into the system via the GUI 60. The inputs might include desired specs or particular uses, such as a microchip for toys in 5 nm process, as well as Integrated Circuit fabrication plant apparatus data. This input information is analyzed by the system, and the artificial intelligence unit runs a simulation, trying millions of potential multi-planar shapes and analyzing for the highest surface area yield. The shapes are tested and the best possible 3D, multi-planar shape 55 is determined, which could be for optimization of surface area, highest silicon yield, highest area utilization, and/or largest silicon surface area.

Upon this determination, the three-dimensional, multi-planar shape 55 that optimizes surface area is constructed. The user can see the constructed shape, along with additional information, on the GUI 60. The user also could elect to run a functional verification and performance optimization testing for the desired microchip. If needed, the user can request a simulation of the optimal thermal dissipation, electrothermal analysis, and/or testing for electrical connectivity considerations of the chip. The simulations may include frequency as an integral part.

As part of the operation, disclosed processes include reading the IC manufacturing geometric, electrical and DFM constraints and creating a dataset that is used to train a machine-learning model. Then another set of processes analyzes the semiconductor design manufacturing process data, applying computational geometry algorithms, and obtaining a best (optimal) 3D, MP shape according to criteria. These criteria include, but are not limited to, feature size, geometrical design rules and restrictions, electrical constraints, DFM constraints that may impact lithography mask layout patterns, and reliability (RV) constraints and guidelines. The reliability verification (RV) constraints may affect the wire's width, length, number of VIAs, and metals used.

The computational geometry processes read the ML conclusions and perform numerous simulations, constructing 3D, MP possible shapes that match the selected manufacturing process data. The program also reads the fabrication plant requirements for that specific manufacturing process (which are driven by the manufacturing apparatus/machinery that the plant has), that other datasets are taking into account. In exemplary embodiments, the program uses Edge-Based mathematical analysis to calculate the highest surface yield, optimal wiring connectivity (for best electrical performance), highest silicon (wafer) area optimization, optimal Electro-Thermal characteristics (maintaining the lowest IC heat), optimal power consumption, compliance with the manufacturing process geometrical, electrical, DFM, and reliability rules.

Exemplary approaches perform a virtual scanning process that analyzes the IC process lithography mask layers, taking into account the design rules (geometrical, electrical, RV, DFM), and obtaining a 3D, MP shape, which is the most optimal for the process. An exemplary approach produces features like the shape's edges and their endpoints, 3D orientation, plane sizes/shapes, MP perspectives, and other geometrical attributes. It checks numerous vertical and horizontal spacing, width, and height options and then applies the conclusions to create 3D, multi-planes virtual structures. The algorithm performs rotations in all 3D axes repeatedly to achieve the optimal shape orientation and plane-related characteristics.

The mathematical processes constantly update the simulated data structures, using search trees to describe the combinatorial structure of each 3D, MP shape. The final testing is done according to priority queue listing that determines the best, optimal 3D, MP shape. The algorithms repeatedly re-generating 3D, MP shapes, maintaining a priority queue, according to the optimal match to selected IC design process characteristics. With each re-generated 3D, MP shape, the geometrical changes are updated incrementally (which means only the changes are recorded; this is done to maintain short run time) within the data structures and re-fed into the ML and computational geometry process for re-processing.

Exemplary operations utilize edge-based analysis, which is related to computational geometry science. Technically, exemplary methods address Manhattan structures and non-Manhattan structures. Due to the increased complexity of advanced IC manufacturing processes (Layout structures) exemplary analysis is based on the fact that wires can intersect at arbitrary angles. For instance, the system may calculate corners' interactions to generate intersecting points.

Exemplary operations use a proprietary development version of an advanced scanline process to address Edge-Based structures. There are several considerations within this process: Edge-based processing leads to a fairly wide datapath. For Manhattan structures, at least 3 coordinate fields (Xmin, Xmax and Y) are needed for each edge: two X-coordinates for beginning and ending points and one Y-coordinate for the edge. Scanline rendering is used for visible surface determination; in DRC analysis its implementation works on a row-by-row basis rather than a polygon-by-polygon or pixel-by-pixel basis. All the polygons to be rendered are first sorted by the top y coordinate at which they first appear, then each row or scan line of the image is computed using the intersection of a scan line with the polygons on the front of the sorted list, while the sorted list is updated to discard no-longer-visible polygons. Disclosed operations use a proprietary scan-line method which is based on a different approach and analysis.

Complex geometrical rules require the generation of intermediate (or "derived") layers that are Boolean transformations of true layers. When a derived layer is generated in an edge-based process, its edge file is not in canonical order, since the edge with the smallest X-coordinate of its ending point leaves the pipeline first. Thus, an intermediate sort is needed. Disclosed operations perform an on-the-fly sorting to calculate the conditional design rules in real time.

One of the key strengths of disclosed embodiments is that they address a full edge-reconciliation. A general method to obtain computational parallelism in manufacturing rules is to cut off each mask layer into pieces and process each piece individually. This is possible in a few approaches including edge-based algorithms. Spurious width/spacing errors, however, could be generated by the analysis system because some regions are split into pieces. Sewing regions back together imposes nontrivial performance overhead (especially for edge-based approaches) when the mask is divided into many small pieces.

The disclosed approach assumes a virtual scanline that passes over the mask layers, checking relevant design rules as it goes, generating a multi-planar object(s) that obey the manufacturing rules. As the scanline passes over the masks, it takes note of features like edges and their endpoints. These endpoints are entered into a simulation of multi-plane shape. To check vertical spacing or widths, the scanline is oriented vertically and scans horizontally across the mask. To check horizontal spacing or widths, the mask is rotated by 90 degrees counterclockwise, and the scanline passes over it again. Disclosed methods use an edge-endpoint-based representation to form numerous 3D, MP shapes that way. All the edges in a mask layer are categorized into horizontal edges and vertical edges and their endpoints are processed separately.

It should be noted that exemplary operations build upon certain processes known in the art. In dot throwing, simulated dots are generated, and the effect of each dot is tallied. This process is repeated enough times to produce an acceptable estimate of an object's area, using Monte Carlo error analysis. Size-based operations use a combination of Boolean operations and sizing operations the overall polygon area can be calculated. The Delaunay triangulation is built upon sets of points and constraining edges. Delaunay triangulations maximize the minimum of all the angles of the triangles in the triangulation. Disclosed processes may simultaneously triangulate points and construct 3D, MP shape's edges and thus avoids consuming location of those triangles containing constraining edges, as used by other approaches. The disclosed process also is considerably simplified by introducing dynamic artificial points which creates a new method for faster processing of edges and corner's intersection points.

The Voronoi diagram method is based on calculation of Voronoi diagrams for each design layer; these diagrams are a partitioning of the plane encoding nearest-neighbor information of the layout shapes on a layer. Constructing the Voronoi diagrams and calculating objects area can both be performed by use of a single scan-line algorithm, for example. The critical area curve is computed completely, for all polygon sizes. This approach can also cover connectivity-based area calculations and sampling. Accounting for connectivity strongly increases accuracy. For instance, when two shapes are "opened," connectivity analysis will determine whether both shapes do not cause any open due to redundancy, will cause a single open because the two shapes belong to the same net, or will cause two opens because the two shapes belong to different nets.

Fortune's algorithm is a sweep line process for generating a Voronoi diagram from a set of points in a plane using O(n log n) time and O(n) space. The process maintains both a sweep line and a beach line, which both move through the plane as the process progresses. The geometrical engine described above may include a proprietary method that performs similar results as Fortune's algorithm but is entirely different mainly for DFM analysis which introduces a new set of geometrical, electrical, and RV constraints. The advanced proprietary method accommodates deep nanometer manufacturing processes (10 nm and below) features, particularly double patterning analysis.

Thus, it is seen that systems and methods of predictive semiconductor manufacturing are provided. It should be understood that any of the foregoing configurations and specialized components or connections may be interchangeably used with any of the systems and/or methods of the preceding embodiments. Although illustrative embodiments are described hereinabove, it will be evident to one skilled in the art that various changes and modifications may be made therein without departing from the scope of the disclosure. It is intended in the appended claims to cover all such changes and modifications that fall within the true spirit and scope of the present disclosure.

What is claimed is:

1. A method of predictive semiconductor manufacturing comprising:
    receiving and analyzing semiconductor design and manufacturing process rules and data;
    receiving and analyzing dimensions for a user's desired semiconductor;
    running simulations trying multiple three-dimensional, multi-planar shapes and analyzing for highest surface area yield based on the design and manufacturing process rules and data and the dimensions;
    determining a three-dimensional, multi-planar shape for the desired semiconductor to optimize surface area based on the simulations; and
    constructing the three-dimensional, multi-planar shape that optimizes surface area.

2. The method of claim 1 wherein the analyzing for highest surface area yield comprises placing test chips on surfaces of the multiple three-dimensional, multi-planar shapes.

3. The method of claim 1 wherein trying multiple three-dimensional, multi-planar shapes comprises starting with a simple shape and increasing a number of surface planes to more complex three-dimensional, multi-planar shapes.

4. The method of claim 3 further comprising studying each shape and its optimization capabilities.

5. The method of claim 3 further comprising running a simulated optimal thermal dissipation test on each shape.

6. The method of claim 1 wherein the semiconductor design and manufacturing process rules comprise one or more of: process geometrical design rules, connectivity design rules, design for manufacturing rules, electrical rules, and reliability rules.

7. The method of claim 1 further comprising simulating packaging to fit the constructed three-dimensional, multi-planar shape.

8. The method of claim 1 further comprising testing the three-dimensional, multi-planar shapes for electrical connectivity and reliability.

9. A predictive multi-planar semiconductor manufacturing system comprising:
    a processor;
    an artificial intelligence unit in communication with the processor; and
    a computer readable memory in communication with the processor, the computer readable memory containing processing instructions;
    the manufacturing system receiving and analyzing semiconductor design and manufacturing process rules and data and dimensions for a user's desired semiconductor;
    the artificial intelligence unit being configured to run simulations trying multiple three-dimensional, multi-planar shapes and analyzing for highest surface area yield based on the design and manufacturing process rules and data and the dimensions;

the artificial intelligence unit being configured to determine a three-dimensional, multi-planar shape for the desired semiconductor to optimize surface area based on the simulations and to construct the three-dimensional, multi-planar shape that optimizes surface area.

10. The manufacturing system of claim 9 further comprising a graphical user interface displaying the constructed three-dimensional, multi-planar shape that optimizes surface area.

11. The manufacturing system of claim 10 wherein the graphical user interface displays analytics for one or more of the three-dimensional, multi-planar shapes, the analytics comprising one or more of: simulation results, surface thermal maps, connectivity maps, and estimated yield area.

12. The manufacturing system of claim 10 wherein the graphical user interface displays statistics including silicon area utilization percentages for one or more of the three-dimensional, multi-planar shapes.

13. The manufacturing system of claim 9 wherein the artificial intelligence unit further comprises a neural network;

wherein the neural network mathematically models semiconductor manufacturing methods and tries multiple three-dimensional, multi-planar shapes starting with a simple shape and increasing a number of surface planes to more complex three-dimensional, multi-planar shapes.

14. The manufacturing system of claim 13 wherein the neural network has cognitive capabilities, learning from its operations to improve the three-dimensional, multi-planar shapes of the semiconductors.

15. The manufacturing system of claim 9 where the three-dimensional, multi-planar shape that optimizes surface area is comprised of segmented data points, creating a unique data set.

16. The manufacturing system of claim 9 wherein the system is configured to receive fabrication apparatus data.

17. The manufacturing system of claim 9 wherein the desired semiconductor is an existing semiconductor; and wherein the artificial intelligence unit determines a three-dimensional, multi-planar shape for the existing semiconductor.

18. The manufacturing system of claim 9 wherein the artificial intelligence unit places test chips on surfaces of the multiple three-dimensional, multi-planar shapes.

19. The manufacturing system of claim 9 wherein the artificial intelligence unit simulates packaging to fit the constructed three-dimensional, multi-planar shape.

20. The manufacturing system of claim 9 wherein the artificial intelligence unit performs an electrothermal flow analysis on the multiple three-dimensional, multi-planar shapes.

* * * * *